US011494913B2

(12) United States Patent
Fukuda et al.

(10) Patent No.: US 11,494,913 B2
(45) **Date of Patent: *Nov. 8, 2022**

(54) MEDICAL CARE SUPPORT DEVICE, MEDICAL CARE SUPPORT METHOD, AND MEDICAL CARE SUPPORT PROGRAM

(71) Applicant: FUJIFILM CORPORATION, Tokyo (JP)

(72) Inventors: Takeshi Fukuda, Kanagawa (JP); Haruyasu Nakatsugawa, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 240 days.

This patent is subject to a terminal disclaimer.

(21) Appl. No.: 17/060,091

(22) Filed: Oct. 1, 2020

(65) Prior Publication Data

US 2021/0104042 A1 Apr. 8, 2021

(30) Foreign Application Priority Data

Oct. 3, 2019 (JP) ............................ JP2019-182722

(51) Int. Cl.

| | |
|---|---|
| ***G06T 7/00*** | (2017.01) |
| ***G06N 20/00*** | (2019.01) |
| ***G06V 40/10*** | (2022.01) |

(52) U.S. Cl.

CPC ........... *G06T 7/0014* (2013.01); *G06N 20/00* (2019.01); *G06V 40/10* (2022.01); *G06T 2207/20081* (2013.01); *G06T 2207/30061* (2013.01); *G06T 2207/30096* (2013.01)

(58) Field of Classification Search

CPC ......... G06T 7/0014; G06T 2207/20081; G06T 2207/30061; G06T 2207/30096; G06N 20/00; G06V 40/10

See application file for complete search history.

(56) References Cited

U.S. PATENT DOCUMENTS

| | | | | |
|---|---|---|---|---|
| 2003/0215119 | A1* | 11/2003 | Uppaluri | G06T 7/0012 382/128 |
| 2010/0063410 | A1* | 3/2010 | Avila | A61B 5/08 600/529 |
| 2012/0275659 | A1* | 11/2012 | Gomas | G06V 10/76 382/110 |
| 2021/0073985 | A1* | 3/2021 | Fukuda | G16H 50/30 |

FOREIGN PATENT DOCUMENTS

| | | |
|---|---|---|
| JP | 2004-000609 A | 1/2004 |

* cited by examiner

*Primary Examiner* — Khai M Nguyen
(74) *Attorney, Agent, or Firm* — Solaris Intellectual Property Group, PLLC

(57) ABSTRACT

A medical care support device includes: an acquisition unit that acquires medical information including medical image data representing a medical image obtained by capturing a lung of a subject, breed information representing a breed of the subject, and age information representing an age of the subject when the medical image is captured; and a derivation unit that derives a degree of calcification of the lung of the subject based on the medical information acquired by the acquisition unit and a learned model learned in advance using a plurality of pieces of learning medical information including medical image data representing a medical image in which a label is assigned to a calcified portion of the lung, the breed information, and the age information.

12 Claims, 32 Drawing Sheets

MEDICAL CARE SUPPORT DEVICE, MEDICAL CARE SUPPORT METHOD, AND MEDICAL CARE SUPPORT PROGRAM

CROSS-REFERENCE TO RELATED APPLICATION

This application claims priority from Japanese Patent Application No. 2019-182722, filed Oct. 3, 2019, the disclosure of which is incorporated herein by reference in its entirety.

BACKGROUND

Technical Field

The present disclosure relates to a medical care support device, a medical care support method, and a medical care support program storage medium.

Related Art

It is generally known that a lung is calcified depending on age. Therefore, the age of a subject is taken into consideration in a case where medical care of a lung disease is performed based on calcification of the lung of the subject. For example, JP2004-000609A discloses a technique of detecting lung disease from the calcification of the lung detected from a medical image of a patient in consideration of the age of the patient.

By the way, it may be difficult to discriminate the calcification of the lung from the medical image. In the technique described in JP2004-000609A, in a case where the calcification of the lung cannot be properly detected from the medical image, the lung disease may not be properly detected. Therefore, the technique described in JP2004-000609A may not be able to effectively support the medical care.

SUMMARY

The present disclosure has been made in view of the above circumstances, and a purpose thereof is to provide a medical care support device, a medical care support method, and a medical care support program storage medium capable of effectively supporting medical care based on calcification of a lung of a subject.

A medical care support device according to a first aspect of the present disclosure comprises an acquisition unit that acquires medical information including medical image data representing a medical image obtained by capturing a lung of a subject, breed information representing a breed of the subject, and age information representing an age of the subject when the medical image is captured, and a derivation unit that derives a degree of calcification of the lung of the subject based on the medical information acquired by the acquisition unit and a learned model learned in advance using a plurality of pieces of learning medical information including medical image data representing a medical image in which a label is assigned to a calcified portion of the lung, the breed information, and the age information.

The medical care support device according to a second aspect of the present disclosure further comprises a warning information output unit that outputs warning information in a case where the degree of calcification of the lung of the subject derived by the derivation unit is larger than a degree of calcification of the lung according to the breed and the age of the subject, based on correspondence relationship information stored in a storage unit that stores the correspondence relationship information representing a correspondence relationship between the breed, the age, and the degree of calcification of the lung, in the medical care support device according to the first aspect.

In the medical care support device according to a third aspect of the present disclosure, the medical information includes a plurality of pieces of the medical image data captured at different ages of the subject, the derivation unit further derives a degree of change in the calcification from the degree of calcification derived for each age of the subject, and the medical care support device further comprises a warning information output unit that outputs warning information in a case where the degree of change in the calcification derived by the derivation unit is larger than a degree of change in the calcification of the lung according to the breed and the age of the subject, based on correspondence relationship information stored in a storage unit that stores the correspondence relationship information representing a correspondence relationship between the breed, the age, and the degree of calcification of the lung, in the medical care support device according to the first aspect.

In the medical care support device according to a fourth aspect of the present disclosure, the warning information output unit further outputs examination item information representing a predetermined examination item for the subject, in a case of outputting the warning information, in the medical care support device according to the second aspect or the third aspect.

In the medical care support device according to a fifth aspect of the present disclosure, a plurality of pieces of learning medical information including medical image data representing a medical image in which a label is assigned to a tumor portion of the lung, the breed information, and the age information are further used for learning of the learned model, and the derivation unit further derives presence or absence of a tumor in the lung of the subject based on the medical information acquired by the acquisition unit and the learned model, in the medical care support device according to any one of the first to fourth aspects.

In the medical care support device according to a sixth aspect of the present disclosure, a plurality of pieces of learning medical information including medical image data representing a medical image in which a label is assigned to an undeterminable portion for the calcification and the tumor of the lung, the breed information, and the age information are further used for the learning of the learned model, and the derivation unit further derives presence or absence of the undeterminable portion in the lung of the subject based on the medical information acquired by the acquisition unit and the learned model, in the medical care support device according to the fifth aspect.

The medical care support device according to a seventh aspect of the present disclosure further comprises an instruction output unit that outputs an instruction for follow-up observation in a case where the derivation unit derives that the undeterminable portion is present, in the medical care support device according to the sixth aspect.

In the medical care support device according to an eighth aspect of the present disclosure, the derivation unit derives the degree of calcification of the lung of the subject based on the medical information acquired by the acquisition unit and a learned model learned in advance using a plurality of pieces of learning medical information including the medical image data to which the label is assigned to the calcified portion of the lung, body type information, and the age information, in a case where the acquisition unit acquires the body type information representing a kind relating to a body type of the subject instead of the breed information of the subject, in the medical care support device of any one of the first to seventh aspects.

In the medical care support device according to a ninth aspect of the present disclosure, the kind relating to the body type is large, medium, or small, in the medical care support device according to the eighth aspect.

In the medical care support device according to a tenth aspect of the present disclosure, the subject is a dog, and the kind relating to the body type is a short-headed species, a middle-headed species, or a long-headed species, in the medical care support device according to the eighth aspect.

A medical care support method according to an eleventh aspect of the present disclosure executed by a computer comprises acquiring medical information including medical image data representing a medical image obtained by capturing a lung of a subject, breed information representing a breed of the subject, and age information representing an age of the subject when the medical image is captured, and deriving a degree of calcification of the lung of the subject based on the acquired medical information and a learned model learned in advance using a plurality of pieces of learning medical information including medical image data representing a medical image in which a label is assigned to a calcified portion of the lung, the breed information, and the age information.

A non-transitory storage medium according to a twelfth aspect of the present disclosure stores a program that causes a computer to execute a medical care support processing, the processing includes: acquiring medical information including medical image data representing a medical image obtained by capturing a lung of a subject, breed information representing a breed of the subject, and age information representing an age of the subject when the medical image is captured, and deriving a degree of calcification of the lung of the subject based on the acquired medical information and a learned model learned in advance using a plurality of pieces of learning medical information including medical image data representing a medical image in which a label is assigned to a calcified portion of the lung, the breed information, and the age information.

The medical care support device according to the present disclosure comprises a memory that stores a command to be executed by a computer, and a processor configured to execute the stored command. The processor acquires medical information including medical image data representing a medical image obtained by capturing a lung of a subject, breed information representing a breed of the subject, and age information representing an age of the subject when the medical image is captured, and derives a degree of calcification of the lung of the subject, based on the acquired medical information and a learned model learned in advance using a plurality of pieces of learning medical information including the medical image data in which a label is assigned to a calcified portion of the lung, the breed information, and the age information.

According to the present disclosure, it is possible to effectively support the medical care based on the calcification of the lung of the subject.

DETAILED DESCRIPTION

Hereinafter, an embodiment for implementing a technique of the present disclosure will be described in detail with reference to drawings. In the following embodiment, a case where a "dog" is employed as a subject will be described.

First Embodiment

Figure 1:
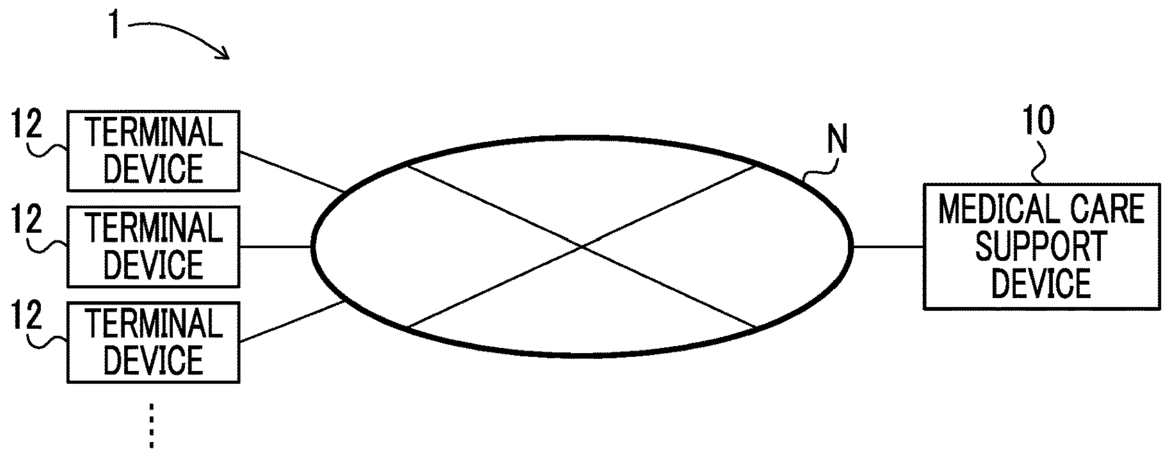
FIG. 1 is a block diagram showing an example of a configuration of a medical care support system according to a first embodiment.

First, a medical care support system 1 according to the present embodiment will be described with reference to FIG. 1. FIG. 1 is a block diagram representing an example of a configuration of the medical care support system 1 according to the present embodiment. As shown in FIG. 1, the medical care support system 1 according to the present embodiment comprises a medical care support device 10 and a plurality (three in FIG. 1 as an example) of terminal devices 12. The medical care support device 10 and the plurality of terminal devices 12 are respectively connected to a network N and can communicate with each other through the network N.

The medical care support device 10 is installed in, for example, an animal hospital. An example of the medical care support device 10 includes a server computer. The medical care support device 10 may be a cloud server. The terminal device 12 is installed in, for example, the animal hospital and used by a user such as a veterinarian. Examples of the terminal device 12 include a personal computer and a tablet computer.

Figure 2:
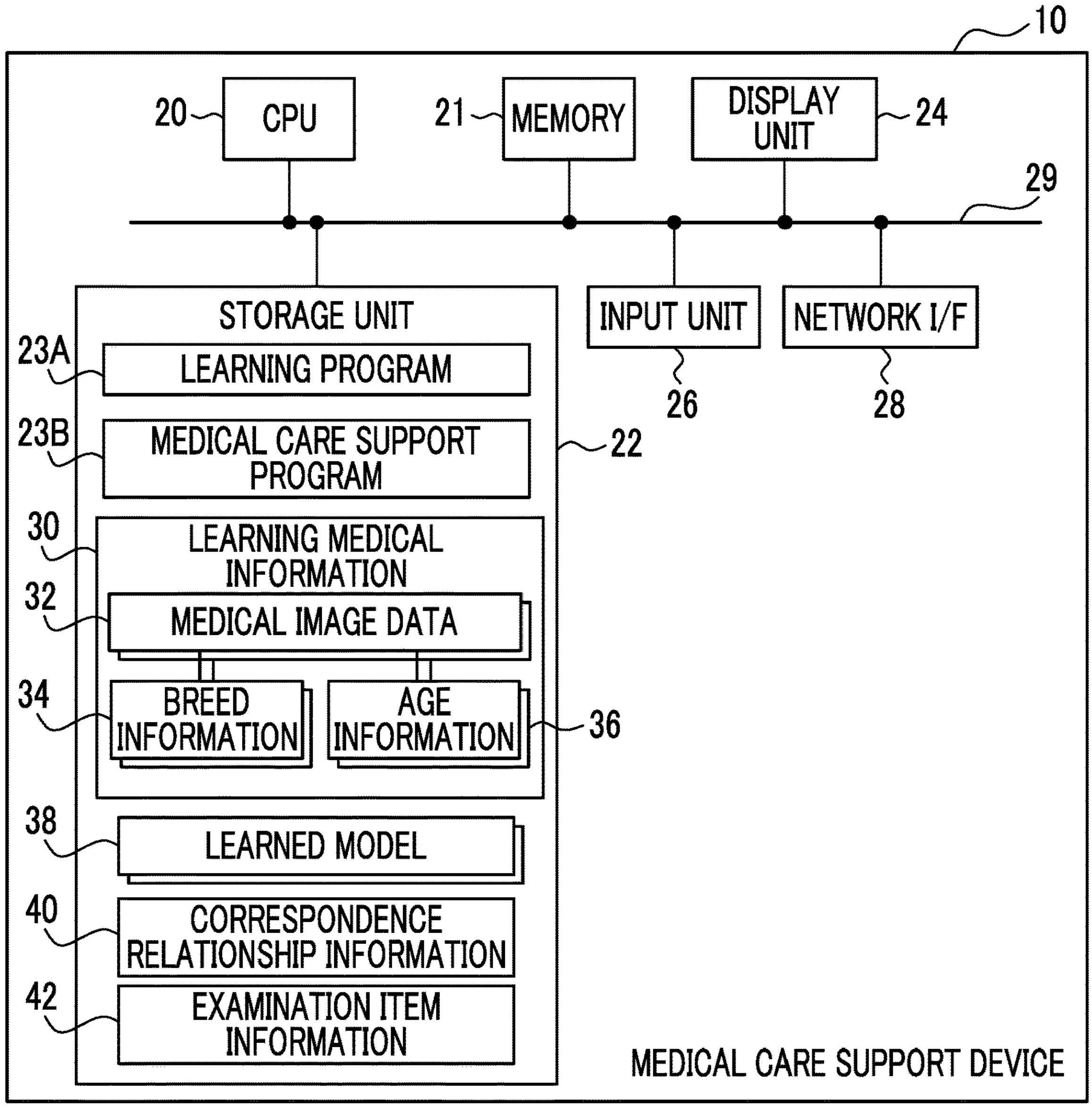
FIG. 2 is a block diagram showing an example of a hardware configuration of a medical care support device according to the first embodiment.

Next, an example of a hardware configuration of the medical care support device 10 according to the present embodiment will be described with reference to FIG. 2. As shown in FIG. 2, the medical care support device 10 includes a central processing unit (CPU) 20, a memory 21 as a temporary storage area, and a nonvolatile storage unit 22. The medical care support device 10 includes a display unit 24 such as a liquid crystal display, an input unit 26 such as a keyboard or a mouse, and a network interface (I/F) 28 connected to the network N. The display unit 24 and the input unit 26 may be integrated as a touch panel display. The CPU 20, the memory 21, the storage unit 22, the display unit 24, the input unit 26, and the network I/F 28 are connected to a bus 29 communicably with each other.

The storage unit 22 is formed by a hard disk drive (HDD), a solid state drive (SSD), a flash memory, and the like. The storage unit 22 as a storage medium stores a learning program 23A. The CPU 20 reads out the learning program 23A from the storage unit 22, develops the program in the memory 21, and executes the developed learning program 23A. The storage unit 22 stores a medical care support program 23B. The CPU 20 reads out the medical care support program 23B from the storage unit 22, develops the program in the memory 21, and executes the developed medical care support program 23B.

The storage unit 22 according to the present embodiment stores learning medical information 30 and a learned model 38 learned using the learning medical information 30.

Figure 3:
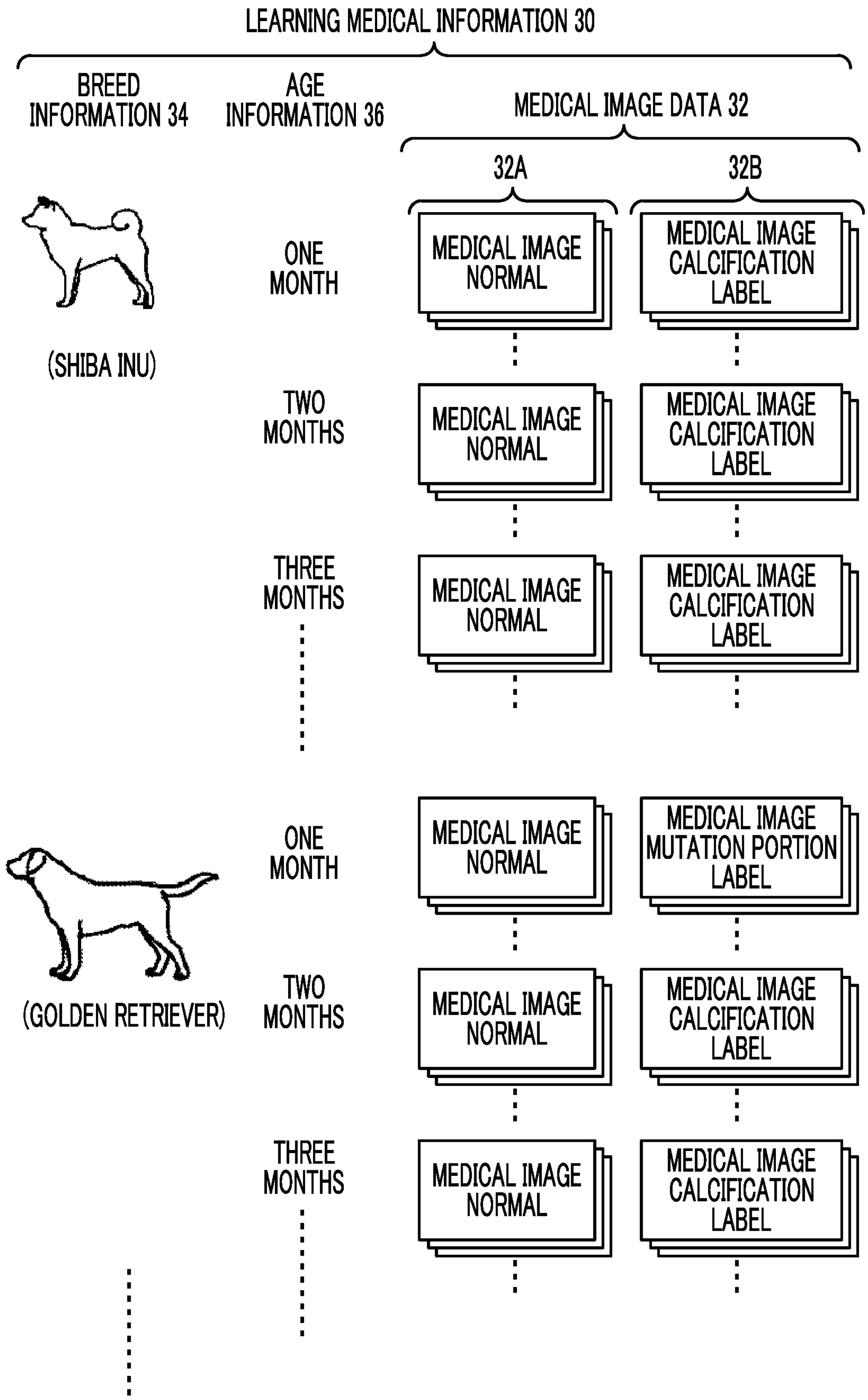
FIG. 3 is a diagram for describing an example of learning medical information according to the first embodiment.

As shown in FIGS. 2 and 3, the learning medical information 30 according to the present embodiment includes medical image data 32, breed information 34, and age information 36 for learning, as an example.

The medical image data 32 is image data representing a medical image 33 in which a label (details will be described below) is assigned to each of a lung and calcification in a medical image obtained by capturing portions including the lung of the dog which is the subject with a medical image capturing device. In the present embodiment, an embodiment of employing a radiographic image according to a radiation amount detected by a radiation detector that irradiates the dog of the subject with radiation and detects radiation transmitted through the dog will be described as the medical image. The medical image may be a magnetic resonance imaging (MRI) image, a computed tomography (CT) image, and the like.

An example of the medical image 33 according to the present embodiment will be described with reference to FIGS. 4A to 4C. The medical images 33 (33A and 33B) shown in FIGS. 4A and 4B are medical images obtained by capturing the lung of the dog in a side surface direction (so-called Lateral).

Figure 4A:
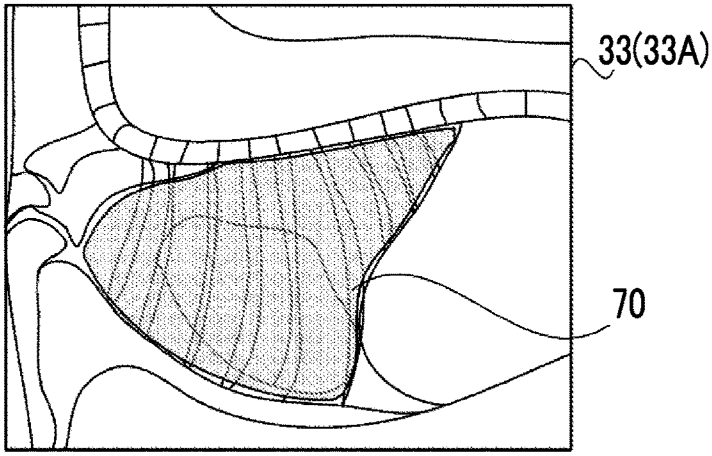
FIG. 4A is a diagram showing an example of a medical image in which a lung label is assigned to a lung.

FIG. 4A shows a medical image 33A in which a label (hereinafter referred to as "lung label") 70 is assigned to the lung. The medical image 33A is a medical image in which the lung in a state where no calcification occurs is captured, and a shadow by the calcification is not viewed in the lung appearing in the medical image 33A. In the present embodiment, a state where the shadow by the calcification is not viewed is referred to as "normal".

Figure 4B:
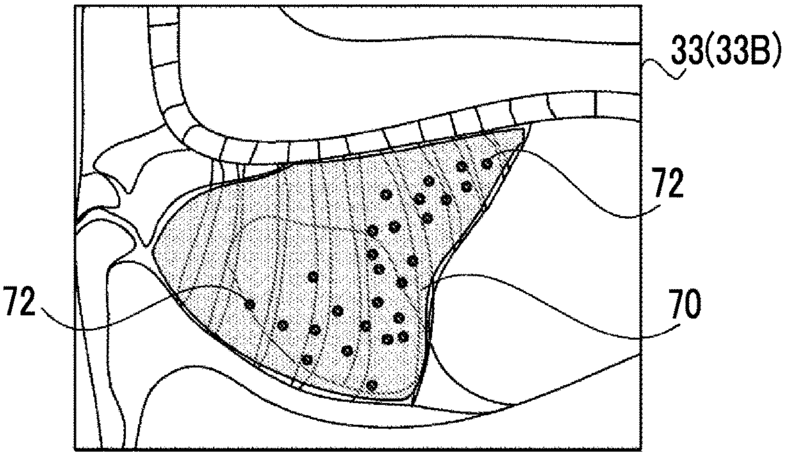
FIG. 4B is a diagram showing an example of a medical image in which the lung label is assigned to the lung and a calcification label is assigned to a calcified mutation portion.

FIG. 4B shows a medical image 33B in which the lung label 70 is assigned to the lung and a label (hereinafter referred to as "calcification label") 72 is assigned to the calcification. The medical image 33B is a medical image in which the lung in a state where calcification occurs is captured, and the calcification label 72 is assigned to the calcification shadow. The calcification refers to deposition of calcium in blood on a tissue and occurs due to an old inflammatory scar such as pulmonary tuberculosis or aging. The calcification tends to appear in the medical image as a frosted glassy shadow or a granular shadow having a diameter of 3 mm or less. Therefore, a calcification finding can be obtained for the frosted glassy shadow and the granular shadow having a diameter of 3 mm or less in the medical image. The calcification label 72 is a label applied to a shadow (mutation portion) where the calcification finding can be obtained.

Figure 4C:
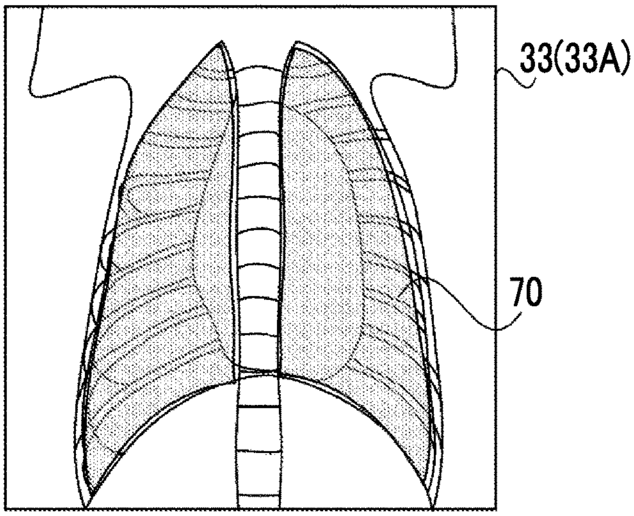
FIG. 4C is a diagram showing another example of the medical image in which the lung label is assigned to the lung.

The medical image may be, for example, the medical image 33A obtained by capturing in a direction from an abdominal side to a back side (so-called Ventral-Dorsal) as shown in FIG. 4C. The medical image 33A shown in FIG. 4C is a normal lung medical image to which the lung label 70 is assigned. In a case where a plurality of medical image data 32 used as the learning medical information 30 include the medical image data 32 based on the medical images 33 having different imaging directions, it is preferable to assign information representing the imaging direction to the medical image data 32.

As described above, the medical image data 32 according to the present embodiment includes a plurality of medical image data 32A representing the normal medical image 33 to which only the lung label 70 is assigned and a plurality of medical image data 32B representing the medical image 33 to which the lung label 70 and the calcification label 72 are assigned.

The breed information 34 is breed information representing a breed of the dog which is the subject and is added to the medical image data 32. Specifically, the breed information 34 is information representing a dog breed since the subject is the dog. In the present embodiment, the "breed" includes a concept of species such as "dog" and "cat" in addition to the breed such as "dog breed".

The age information 36 is age information representing an age of the dog which is the subject and is added to the medical image data 32. The age information 36 is information representing an elapsed time from birth of the subject. In the present embodiment, the age is referred to for convenience, but an elapsed time in month units, that is, a month age is employed instead of an elapsed time in year units from the birth. For example, in a case of the dog or the like, which has a relatively high growth rate, the age in year units may not be enough to cope with the progress of calcification. Therefore, in the present embodiment, information representing the month age is employed as the age information 36 as described above. As described above, the elapsed time from the birth of the subject represented by the age information 36 is preferably determined according to the breed or the like of the subject, and is not limited to the age or the month age, and may be, for example, a day age.

Figure 5:
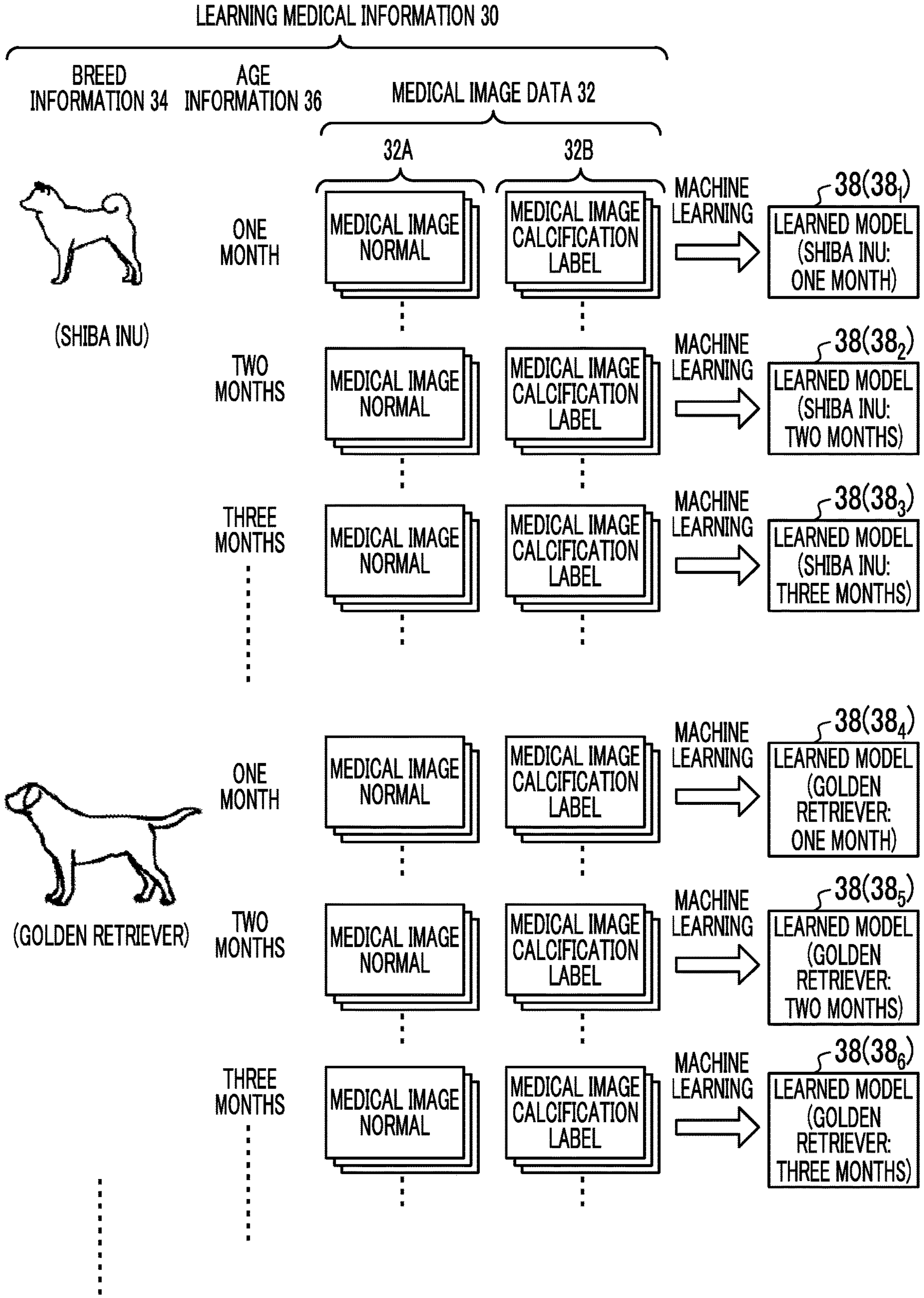
FIG. 5 is a diagram for describing a learned model according to the first embodiment.

The learned model 38 is a model learned in advance using the learning medical information 30. In the present embodiment, the learned model 38 is generated by machine learning using the learning medical information 30 as shown in FIG. 5 as an example. For example, in a case where the dog breed represented by the breed information 34 is "Shiba Inu", a learned model $\mathbf{38}_1$ for which the dog breed is Shiba Inu and the age is one month is generated from the medical image data 32A and 32B whose age represented by the age information 36 is "one month", as shown in FIG. 5. A learned model $\mathbf{38}_2$ for which the dog breed is Shiba Inu and the age is two months is generated from the medical image data 32A and 32B whose age represented by the age information 36 is "two months". A learned model $\mathbf{38}_3$ for which the dog breed is Shiba Inu and the age is three months is generated from the medical image data 32A and 32B whose age represented by the age information 36 is "three months".

For example, in a case where the dog breed represented by the breed information 34 is "Golden Retriever", a learned model $\mathbf{38}_4$ for which the dog breed is Golden Retriever and the age is one month is generated from the medical image data 32A and 32B whose age represented by the age information 36 is "one month", as shown in FIG. 5. A learned model $\mathbf{38}_5$ for which the dog breed is Golden Retriever and the age is two months is generated from the medical image data 32A and 32B whose age represented by the age information 36 is "two months". A learned model $\mathbf{38}_6$ for which the dog breed is Golden Retriever and the age is three months is generated from the medical image data 32A and 32B whose age represented by the age information 36 is "three months". An example of the learned model 38 includes a neural network model.

FIG. 5 shows the learned models $\mathbf{38}_1$ to $\mathbf{38}_6$ in the case where the dog breeds are "Shiba Inu" and "Golden Retriever" and the ages are "one month" to "three months". However, the dog breed and the age are not limited thereto. In a case where the learned models $\mathbf{38}_1$ to $\mathbf{38}_6$ are collectively referred to without distinction, the symbols "1" to "6" for distinguishing the individual models are omitted and the models are referred to as "learned model 38".

As shown in FIG. 2, correspondence relationship information 40 is stored in the storage unit 22 according to this embodiment. The correspondence relationship information 40 is information representing a correspondence relationship between the breed (dog breed), the age, and a degree of calcification of the lung. An example of the "degree of calcification" includes a ratio of a total area of the calcification shadows to an area of a lung portion appearing in the medical image. Specifically, the example of the "degree of calcification" includes a ratio of an area of all calcification labels 72 to an area of the lung label 70 in the medical image 33B (refer to FIG. 4B) (total value of the areas of the calcification label 72/area of the lung label 70). For example, each stage in a case where the ratio of the total area of the calcification shadows to the area of the lung portion is classified into a plurality of stages, each stage in a case where the number of pieces of calcification, a size of calcification, or the like for the entire lung is classified into a plurality of stages, or the like may be employed as the degree.

Figure 6:
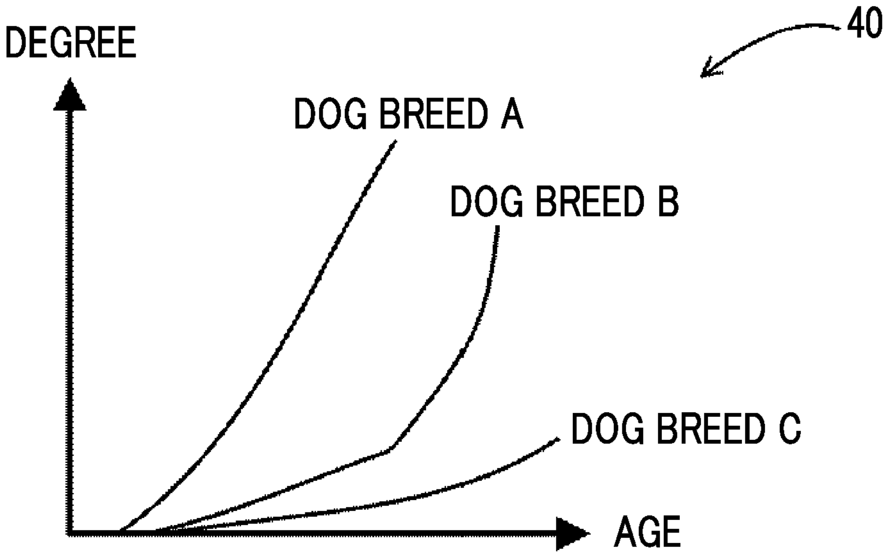
FIG. 6 is a diagram showing an example of correspondence relationship information representing a correspondence relationship between a breed (dog breed), an age, and a degree of calcification of the lung.

It is generally known that the calcification tends to progress with the aging. The correspondence relationship information 40 is information representing the degree of calcification due to aging for each dog breed and is information representing a progressing state of the calcification due to the aging. The correspondence relationship information 40 shown in FIG. 6 indicates the correspondence relationship between the age and the degree of calcification of the lung for each of a dog breed A that is easily calcified, a dog breed B that is easily calcified from a certain age, and a dog breed C that is difficult to calcify. In the present embodiment, the degree of calcification of the lung according to the age of each dog breed represented by the correspondence relationship information 40 is referred to as a "reference degree of calcification". That is, the reference degree of calcification refers to a degree of age-correspondent calcification in the dog breed.

Examination item information 42 is stored in the storage unit 22 according to the present embodiment. The examination item information 42 is information representing an examination item recommended to be performed on the subject in a case where the degree of calcification of the lung is large. For example, a case where the degree of calcification of the lung of the subject is larger than the reference degree of calcification means that calcification equal to or larger than the calcification due to the aging occurs. In such a case, the calcification may occur due to the subject suffering from some disease. Therefore, an examination item for the disease or the like accompanied by the calcification is recommended in the medical care support device 10 according to the present embodiment. The disease in which the calcification progresses is not limited to a disease relating to the lung, and examples thereof include hyperparathyroidism and the like. Examples of the examination item for hyperparathyroidism include a blood test and the like.

Figure 7:
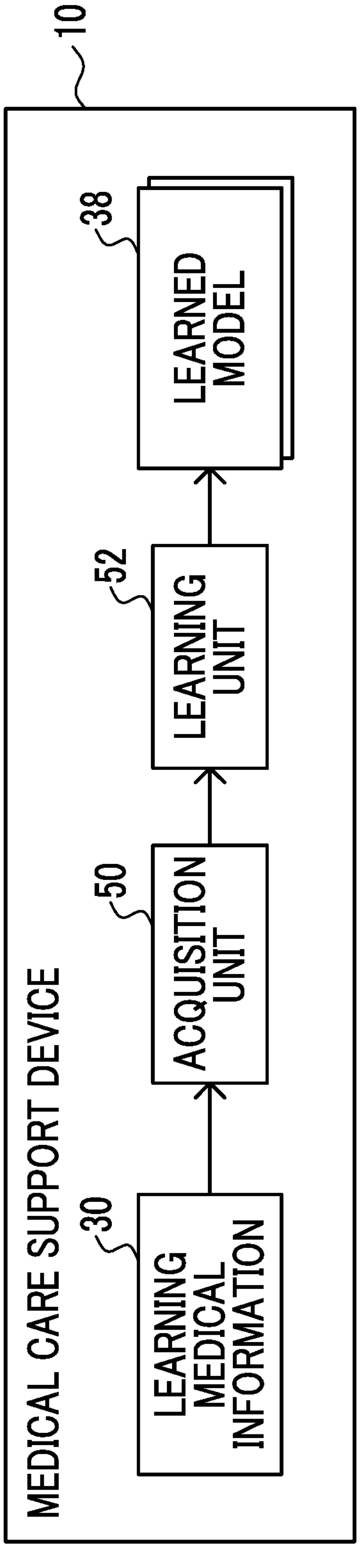
FIG. 7 is a block diagram showing an example of a functional configuration of the medical care support device according to the first embodiment in a learning phase.

Next, a functional configuration of the medical care support device 10 according to the present embodiment in a learning phase will be described with reference to FIG. 7. As shown in FIG. 7, the medical care support device 10 includes an acquisition unit 50 and a learning unit 52. The CPU 20 executes the learning program 23A to function as the acquisition unit 50 and the learning unit 52.

The acquisition unit 50 acquires the learning medical information 30 from the storage unit 22.

The learning unit 52 performs learning of the learning medical information 30 acquired by the acquisition unit 50 as learning data (also referred to as teacher data) to generate the learned model 38 that outputs information on the calcification of the lung based on the learning medical information 30. Specifically, the learning unit 52 generates, by machine learning, a plurality of learned models 38 according to combinations of the breed and the age that receive the medical image data 32 and output the information representing the degree of calcification of the lung in the medical image 33 represented by the medical image data 32, for each combination of the dog breed represented by the breed information 34 and the age represented by the age information 36.

More specifically, in a case where the medical image data 32 to which "Shiba Inu" is added as the dog breed represented by the breed information 34 and "one month" is added as the age represented by the age information 36 is input, the learning unit 52 causes the model to learn such that the information representing the degree of calcification is output. With the learning, the learned model $\mathbf{38}_1$ for which the dog breed is Shiba Inu and the age is one month is generated.

Similarly, in a case where the medical image data 32 to which "Shiba Inu" is added as the dog breed represented by the breed information 34 and "two months" is added as the age represented by the age information 36 is input, the learning unit 52 causes the model to learn such that the information representing the degree of calcification is output. With the learning, the learned model $\mathbf{38}_2$ for which the dog breed is Shiba Inu and the age is two months is generated.

Similarly, in a case where the medical image data 32 to which "Golden Retriever" is added as the dog breed represented by the breed information 34 and "one month" is added as the age represented by the age information 36 is input, the learning unit 52 causes the model to learn such that the information representing the degree of calcification is output. With the learning, the learned model $\mathbf{38}_4$ for which the dog breed is Golden Retriever and the age is one month is generated.

Figure 8:
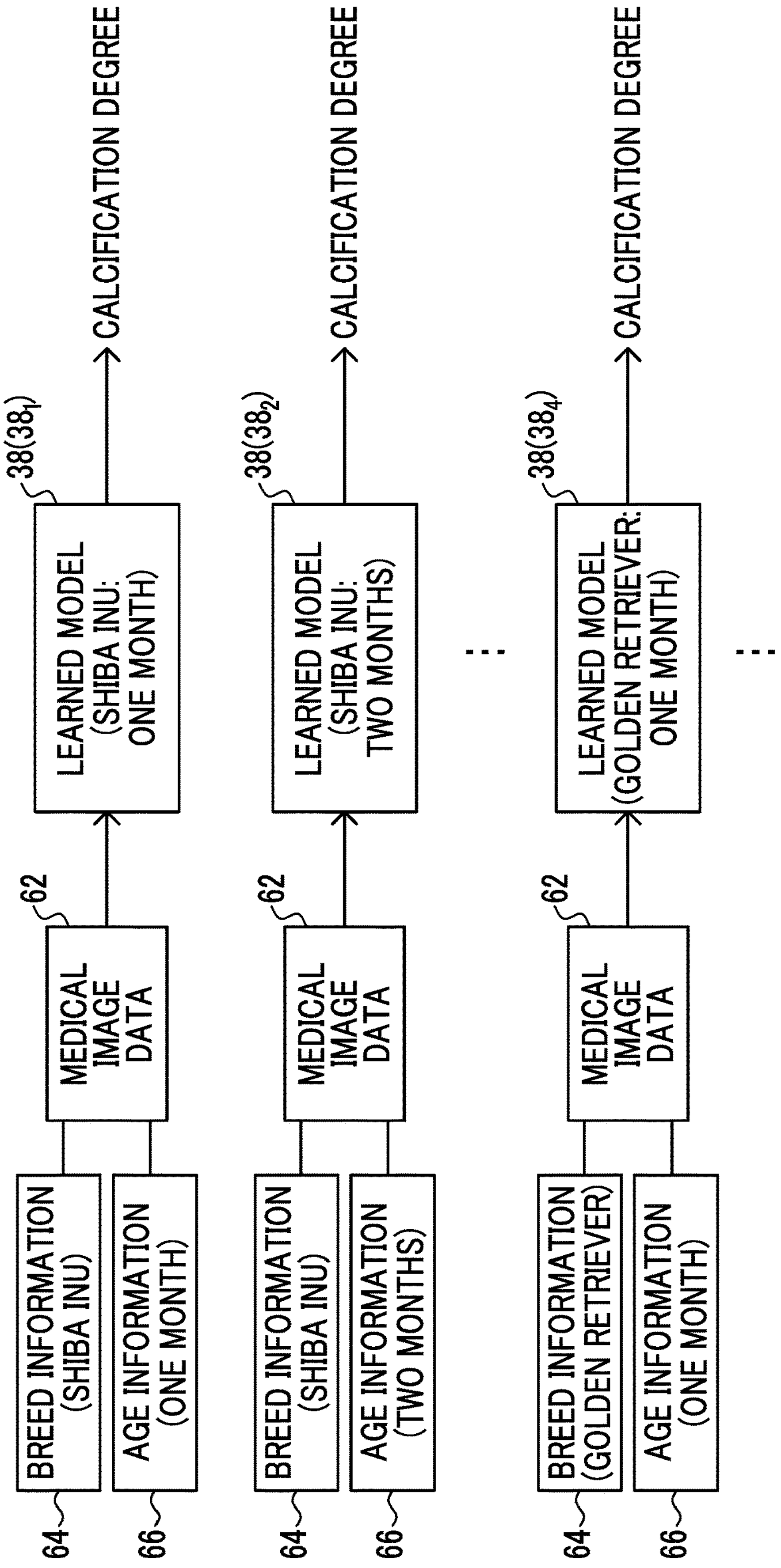
FIG. 8 is a diagram for describing an input and an output of the learned model according to the first embodiment.

For example, an error back propagation method may be employed as an algorithm of the learning by the learning unit 52 described above. As shown in FIG. 8 as an example, the learned model 38 is generated by the learning by the learning unit 52 described above, which receives medical image data 62, breed information 64, and age information 66 and the age and outputs the information representing the degree of calcification for the calcification of the lung of the subject appearing in the medical image represented by the input medical image data 62, for each combination of the breed (dog breed). The learning unit 52 stores the generated learned model 38 in the storage unit 22. In the present embodiment, in a case where the medical image data 62, the breed information 64, and the age information 66 are collectively referred to, the information is referred to as "medical information".

Next, an action of the medical care support device 10 according to the present embodiment in the learning phase will be described with reference to FIG. 9. The CPU 20 executes the learning program 23A to execute learning processing shown in FIG. 9.

Figure 9:
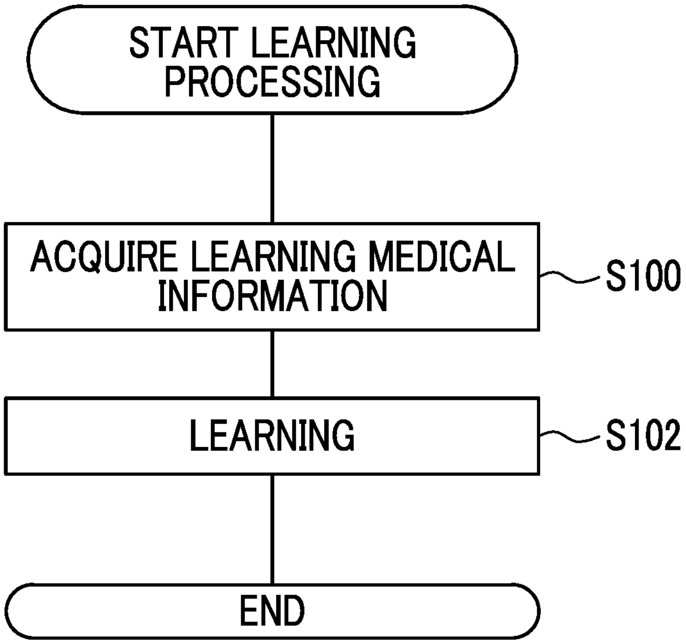
FIG. 9 is a flowchart showing an example of learning processing executed by the medical care support device according to the first embodiment.

In step S100 in FIG. 9, the acquisition unit 50 acquires the learning medical information 30 from the storage unit 22.

In next step S102, the learning unit 52 causes the model to learn for each combination of the dog breed and the age with the learning medical information 30 acquired in step S100 as the learning data, as described above. With the learning, the learning unit 52 generates the learned model 38 that outputs the information representing the degree of calcification of the subject based on the medical image data 62, the breed information 64, and the age information 66. The learning unit 52 stores the generated learned model 38 in the storage unit 22. In a case where the processing in step S102 ends, the learning processing ends.

Figure 10:
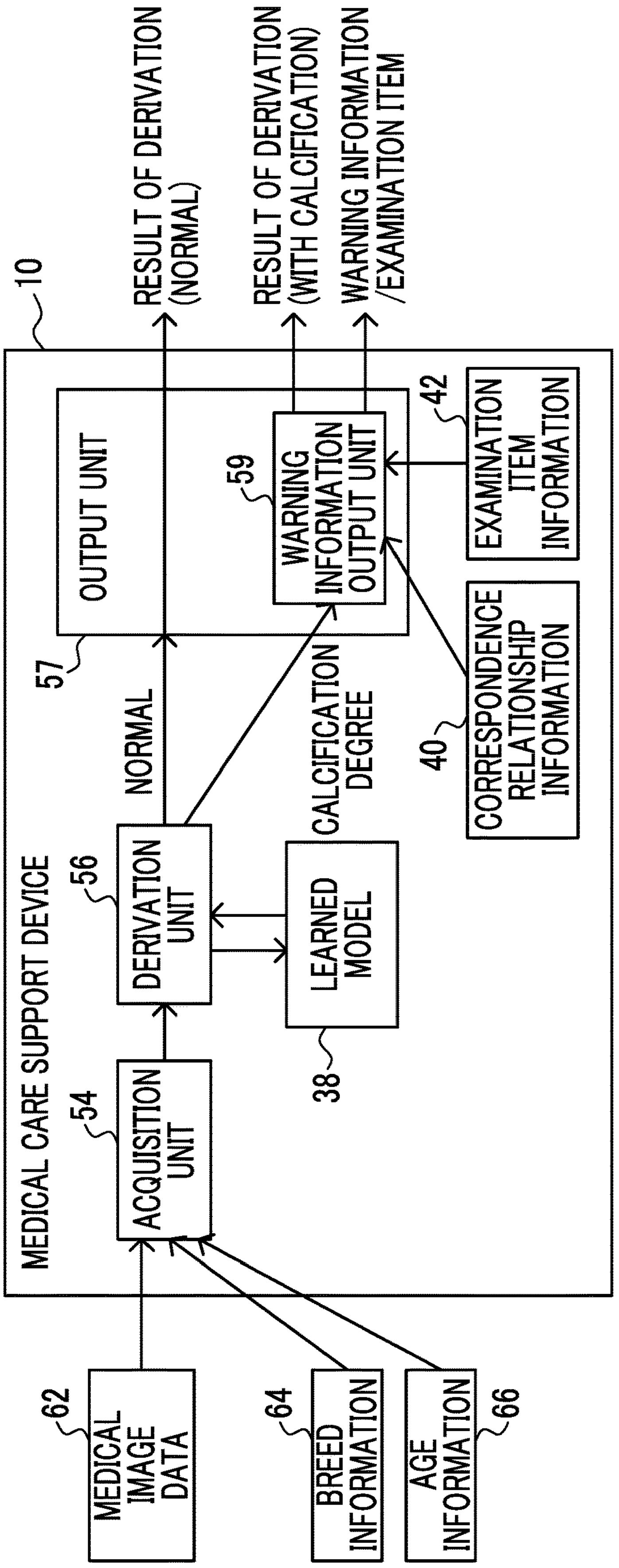
FIG. 10 is a block diagram showing an example of a functional configuration of the medical care support device according to the first embodiment in an operation phase.

Next, a functional configuration of the medical care support device 10 according to the present embodiment in the operation phase will be described with reference to FIG. 10. As shown in FIG. 10, the medical care support device 10 according to the present embodiment includes an acquisition unit 54, a derivation unit 56, and an output unit 57. The CPU 20 executes the medical care support program 23B to function as the acquisition unit 54, the derivation unit 56, and the output unit 57. The acquisition unit 54 is an example of an acquisition unit according to the present disclosure, and the derivation unit 56 is an example of a derivation unit according to the present disclosure. The medical care support device 10 may be the same device in the learning phase and the operation phase or may be different devices.

The acquisition unit 54 acquires the medical image data 62 representing a medical image obtained by capturing an animal of a subject which is a medical care target by the user such as the veterinarian using the medical image capturing device, the breed information 64 representing a dog breed of the subject, and the age information 66 representing an age of the subject as the medical information. Each of the breed information 64 and the age information 66 may be added to the medical image data 62 or may be input by the user through an operation unit (not shown) of the terminal device 12.

The derivation unit 56 derives the degree of calcification of the subject, based on the medical information (the medical image data 62, the breed information 64, and the age information 66) acquired by the acquisition unit 54 and the learned model 38 learned in advance by the learning medical information 30. Specifically, the derivation unit 56 inputs the medical image data 62 acquired by the acquisition unit 54 to the learned model 38 according to the combination of the dog breed represented by the breed information 64 and the age represented by the age information 66 which are acquired by the acquisition unit 54. The learned model 38 outputs the information representing the degree of calcification of the subject according to the input medical information.

The derivation unit 56 determines whether or not the lung of the subject is normal, specifically, the calcification occurs in the lung of the subject, based on the information representing the degree of calcification output from the learned model 38. As an example, the derivation unit 56 according to the present embodiment determines that the degree of calcification of the subject is normal in a case where the degree of calcification of the subject is "0 (zero)". In other words, the derivation unit 56 determines whether or not the calcification occurs in the lung of the subject for the degree of calcification with "0 (zero)" as a threshold value. A threshold value for determining that the calcification does not occur in the lung of the subject (normal) is not limited to this embodiment and may be a value to the extent that the calcification is regarded as not occurring, including an error and the like.

In a case where the lung of the subject is determined to be normal, the derivation unit 56 outputs a derivation result representing that the lung of the subject is normal to the output unit 57, instead of the derived degree of calcification. In a case where the lung of the subject is determined to be abnormal, the derivation unit 56 outputs information representing the derived degree of calcification to the output unit 57 as the derivation result.

In a case where the information indicating that the lung of the subject is normal is input, the output unit 57 outputs the derivation result that the lung is normal. Specifically, in a case where the derivation result representing that the lung of the subject is normal is input from the derivation unit 56, the output unit 57 according to the present embodiment outputs the derivation result that the lung of the subject is normal to the terminal device 12 to display the derivation result on a display unit (not shown) of the terminal device 12. The user interprets the medical image represented by the medical image data 62 with reference to the derivation result displayed on the display unit of the terminal device 12 and performs the medical care based on the calcification of the lung of the subject.

The output unit 57 according to the present embodiment includes a warning information output unit 59. The warning information output unit 59 according to the present embodiment is an example of a warning information output unit according to the present disclosure. The warning information output unit 59 outputs warning information representing a warning in a case where the degree of calcification of the subject is larger than the reference degree of calcification. In this case, the warning information output unit 59 outputs the information representing the examination item acquired from the examination item information 42. Specifically, the warning information output unit 59 refers to the correspondence relationship information 40 and outputs the information representing predetermined warning information and examination item to the terminal device 12 to display the warning information and the examination item on the display unit (not shown) of the terminal device 12 in a case where the degree of calcification input from the derivation unit 56 is larger than the reference degree of calcification. The user interprets the medical image represented by the medical image data 62 with reference to the warning information and the examination item displayed on the display unit of the terminal device 12 and performs the medical care for the calcification of the lung of the subject. The warning information output unit 59 may also display the degree of calcification on the display unit of the terminal device 12 in addition to the information representing the warning information and the examination item.

The warning information output unit 59 outputs the derivation result that the calcification occurs (calcification is present) to the terminal device 12 to display the derivation result on the display unit (not shown) of the terminal device 12, in a case where the degree of calcification input from the derivation unit 56 is equal to or less than the reference degree of calcification. In this case, the warning information output unit 59 may also output the degree of calcification or the fact that the degree of calcification is equal to or less than the age-correspondent calcification. The user interprets the medical image represented by the medical image data 62 with reference to the derivation result displayed on the display unit of the terminal device 12 and performs the medical care based on the calcification of the lung of the subject.

Next, an action of the medical care support device 10 according to the present embodiment in the operation phase will be described with reference to FIG. 11. The CPU 20 executes the medical care support program 23B to execute the medical care support processing shown in FIG. 11.

Figure 11:
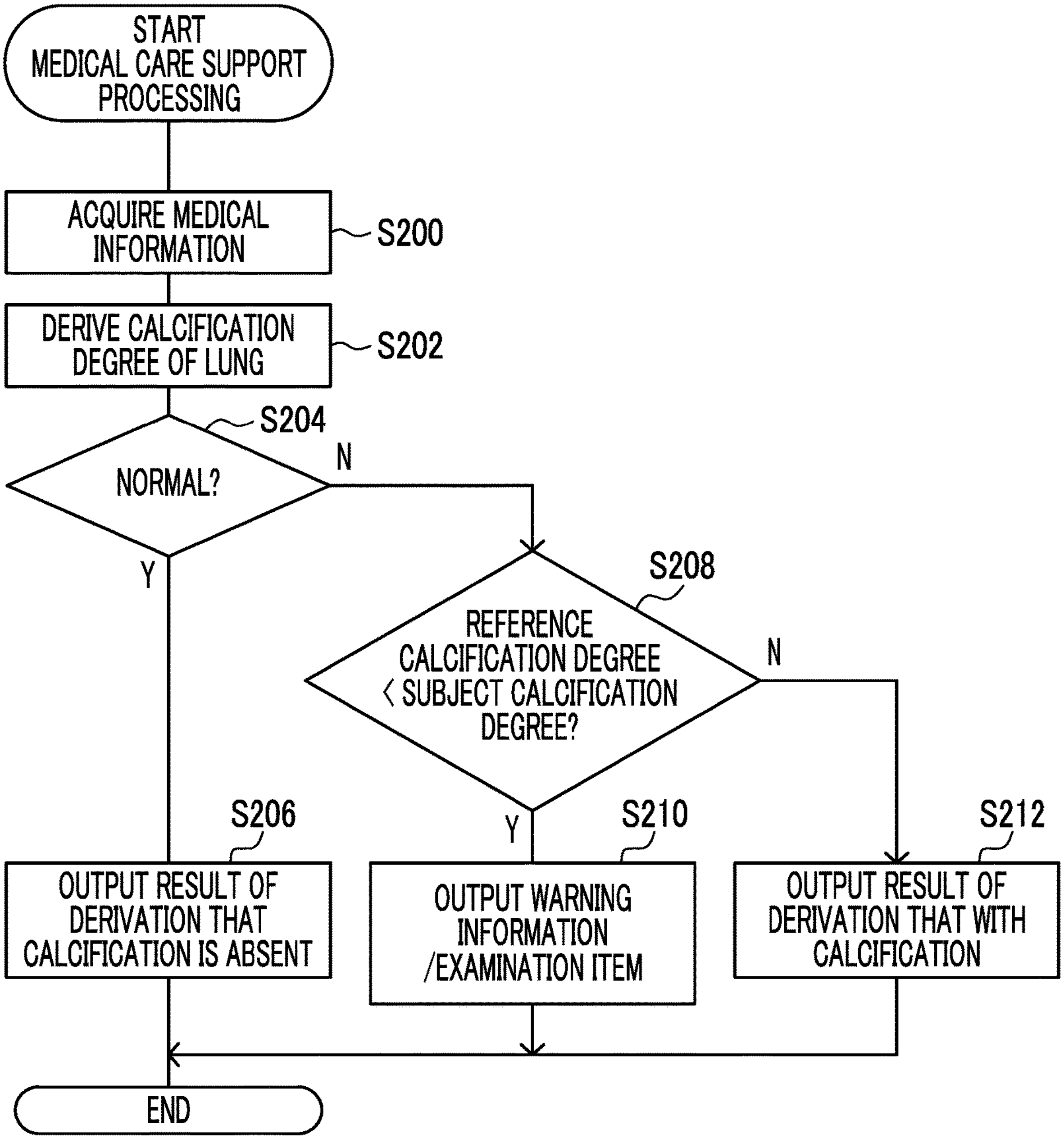
FIG. 11 is a flowchart showing an example of medical care support processing executed by the medical care support device according to the first embodiment.

In step S200 in FIG. 11, the acquisition unit 54 acquires the medical information of the dog which is the subject and outputs the medical information to the derivation unit 56. Specifically, the acquisition unit 54 acquires the medical image data 62 representing a medical image obtained by capturing the dog of the subject which is the medical care target by the user using the medical image capturing device, the breed information 64 representing the breed of the subject, and the age information 66 representing the age of the subject.

In next step S202, the derivation unit 56 derives the degree of calcification of the lung of the subject based on the medical information input from the acquisition unit 54 and the learned model 38, as described above. Specifically, the derivation unit 56 inputs the medical image data 62 to the learned model 38 selected according to a combination of the breed information 64 and the age information 66 in the input medical information to acquire the information representing the degree of calcification of the lung output from the learned model 38.

Figure 12:
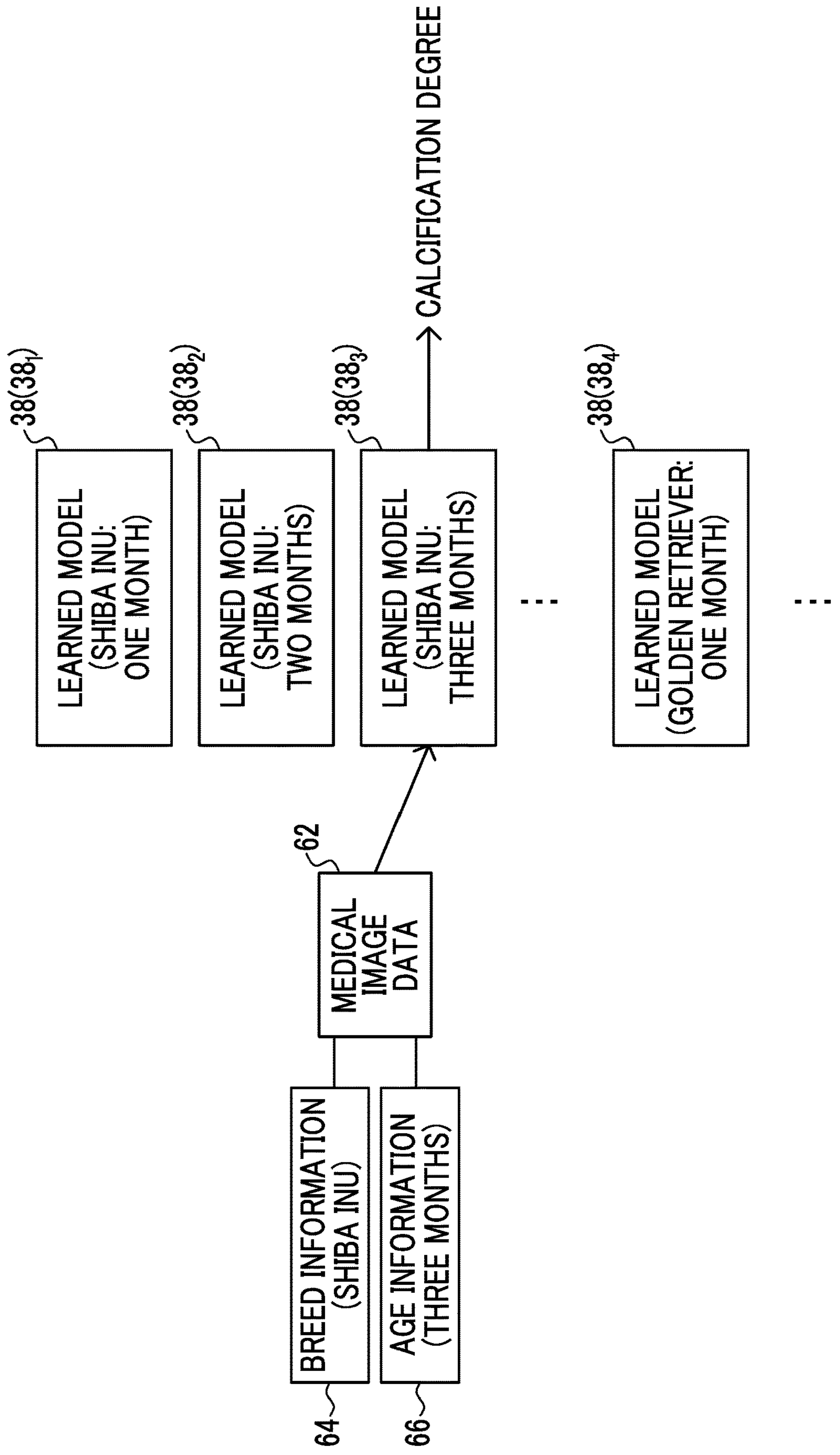
FIG. 12 is a diagram for describing derivation of a degree of calcification using the learned model according to a combination of a dog breed and an age in the medical care support device according to the first embodiment.

For example, as shown in FIG. 12, in a case where the dog breed represented by the breed information 64 in the medical information is "Shiba Inu" and the information represented by the age information 66 is "three months", the derivation unit 56 inputs the medical image data 62 to the learned model $\mathbf{38_3}$ for which the dog breed is Shiba Inu and the age is three months. The information representing the degree of calcification of the lung of the subject is output from the learned model $\mathbf{38_3}$.

In next step S204, the derivation unit 56 determines whether or not the lung of the subject is normal as described above. In a case where the derivation unit 56 determines that the lung of the subject is normal based on a comparison result of comparing the degree of calcification of the subject with the threshold value based on the information representing the calcification output by the learned model 38, the determination in step S204 is affirmative and the processing proceeds to step S206. In step S206, the output unit 57 outputs the derivation result that the lung of the subject is normal, as described above. In a case where the processing in step S206 ends, the medical care support processing ends.

On the other hand, in a case where the derivation unit 56 determines that the lung of the subject is abnormal, the determination in step S204 is negative and the processing proceeds to step S208. In step S208, the warning information output unit 59 refers to the correspondence relationship information 40 as described above and determines whether or not the degree of calcification of the subject is larger than the reference degree of calcification (reference degree of calcification<degree of calcification of subject). In a case where the degree of calcification of the subject is larger than the reference degree of calcification, the determination in step S208 is affirmative and the processing proceeds to step S210. In step S210, the warning information output unit 59 outputs the information representing the warning information and the examination item as described above. In a case where the processing in step S210 ends, the medical care support processing ends.

On the other hand, in a case where the degree of calcification of the subject is equal to or less than the reference degree of calcification, the determination in step S208 is negative and the processing proceeds to step S212. In step S212, the warning information output unit 59 outputs the derivation result that the calcification is present as described above. In a case where the processing in step S212 ends, the medical care support processing ends.

As described above, with the medical care support device 10 according to the present embodiment, the degree of calcification of the subject is derived based on the medical information including the medical image data 62, the breed information 64, and the age information 66, and the learned model 38.

As described above, the calcification of the lung generally progresses due to the aging, but the progress thereof may be accelerated due to the disease or the like suffered by the subject. The calcification of the lung does not easily appear as a symptom. Therefore, it is important to know the degree of calcification in the medical care for the subject. For example, it is possible to support the user in distinguishing the calcification from a tumor in the medical image by presenting the degree of calcification of the subject. Therefore, with the medical care support device 10 according to the present embodiment, it is possible to effectively support the medical care based on the calcification of the lung of the subject.

Second Embodiment

Hereinafter, a second embodiment will be described in detail.

In the present embodiment, a form will be described in which the medical care support device 10 derives the presence or absence of a tumor in addition to the degree of calcification of the lung of the subject.

A configuration of the medical care support system 1 according to the present embodiment is the same as the configuration of the medical care support system 1 according to the first embodiment (refer to FIG. 1), and a description thereof will be omitted.

On the other hand, in the medical care support device 10 according to the present embodiment, the medical image data 32 included in the learning medical information 30 used for learning the learned model 38 is different from that of the first embodiment. Therefore, the medical image data 32 of this embodiment will be described in detail with reference to FIGS. 13 and 14A to 14C.

Figure 13:
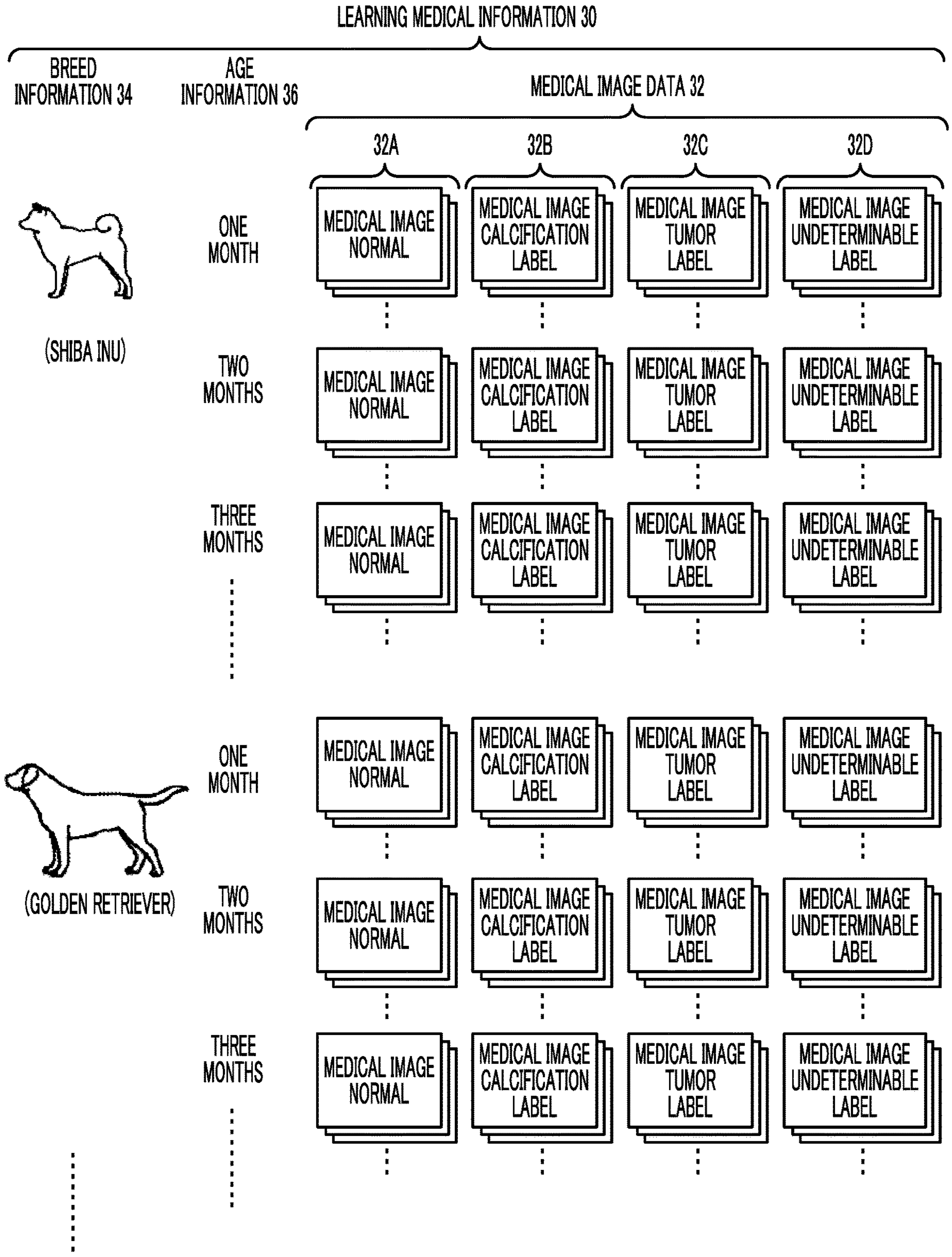
FIG. 13 is a diagram for describing an example of learning medical information according to a second embodiment.

As shown in FIG. 13, the medical image data 32 in the learning medical information 30 according to the present embodiment includes the medical image data 32A, the medical image data 32B, medical image data 32C, and medical image data 32D. As described above, the medical image data 32A is the medical image data representing the medical image 33A to which the lung label 70 is assigned. The medical image data 32B is the medical image data representing the medical image 33B to which the lung label 70 and the calcification label 72 are assigned.

On the other hand, the medical image data 32C is medical image data representing a medical image 33C (refer to FIGS. 14A and 14B) to which the lung label 70 and a label (hereinafter referred to as "tumor label") 74 to the tumor are assigned. The medical image data 32D is medical image data representing a medical image 33D (refer to FIG. 14C) to which the lung label 70 and a label (hereinafter referred to as "undeterminable label") 76 to an undeterminable shadow are assigned.

Figure 14A:
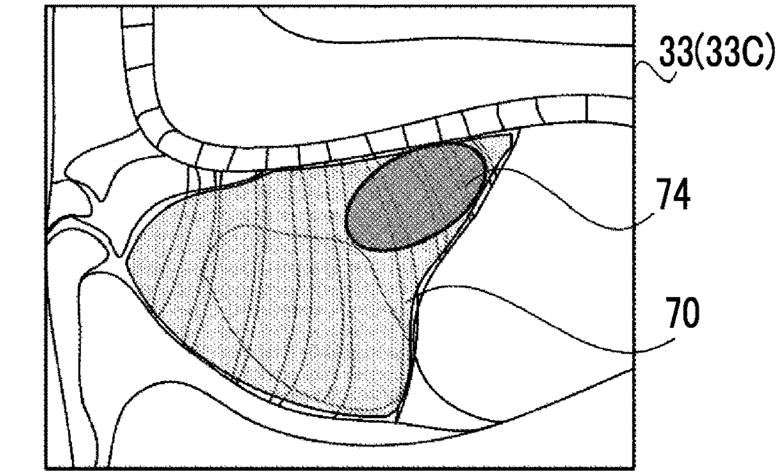
FIG. 14A is a diagram showing an example of a medical image in which a lung label is assigned to a lung and a tumor label is assigned to a tumor.
Figure 14B:
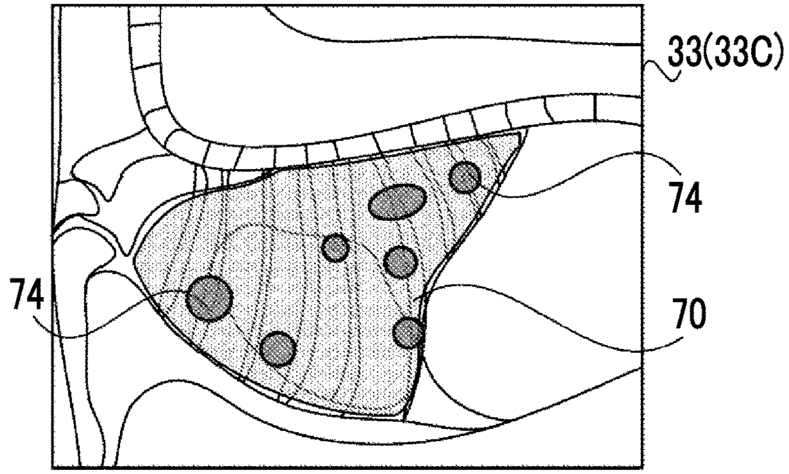
FIG. 14B is a diagram showing an example of the medical image in which the lung label is assigned to the lung and tumor labels are assigned to tumors.
Figure 14C:
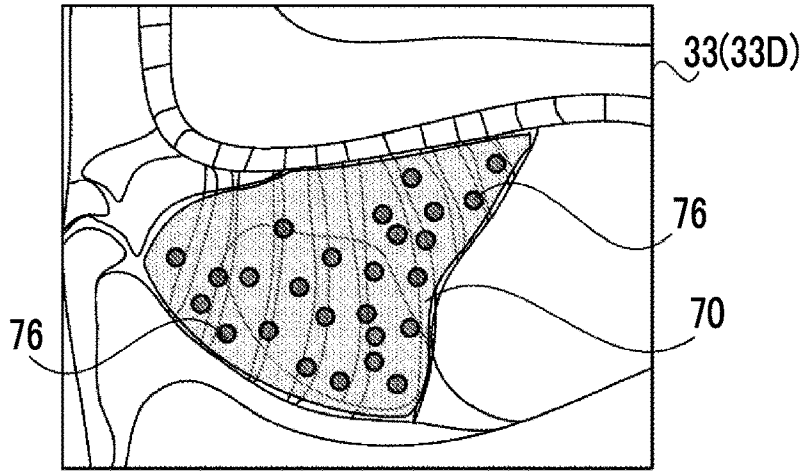
FIG. 14C is a diagram showing an example of a medical image in which the lung label is assigned to the lung and an undeterminable label is assigned to undeterminable portions.

FIGS. 14A and 14B show the medical images 33C in which the lung label 70 is assigned to the lung and the tumor label 74 is assigned. FIG. 14C shows the medical image 33D in which the lung label 70 is assigned to the lung and the undeterminable label 76 is assigned to the undeterminable shadow.

Examples of the shadows seen in the medical image of the lung include not only those caused by the calcification described above but also those caused by the tumor. As described above, the calcification tends to appear in a medical image as a frosted glassy shadow or a granular shadow having a diameter of 3 mm or less. On the other hand, the tumor tends to appear as a large shadow in the medical image as compared with the calcification. However, in an initial state of the tumor, particularly in an initial state of miliary tumor, the tumor appears as a relatively small granular shadow. Therefore, for example, it may be unable to determine whether a granular shadow having a diameter of about 3 mm is due to the calcification or the tumor. In the present embodiment, the undeterminable label 76 is assigned to such a shadow (mutation portion) that is unable to be determined whether it is due to any one of the calcification or the tumor, as in the medical image 33D shown in FIG. 14C. In the present embodiment, "normal" refers to a state where any shadow due to the tumor and the undeterminable portion is not viewed, in addition to the calcification.

Figure 15:
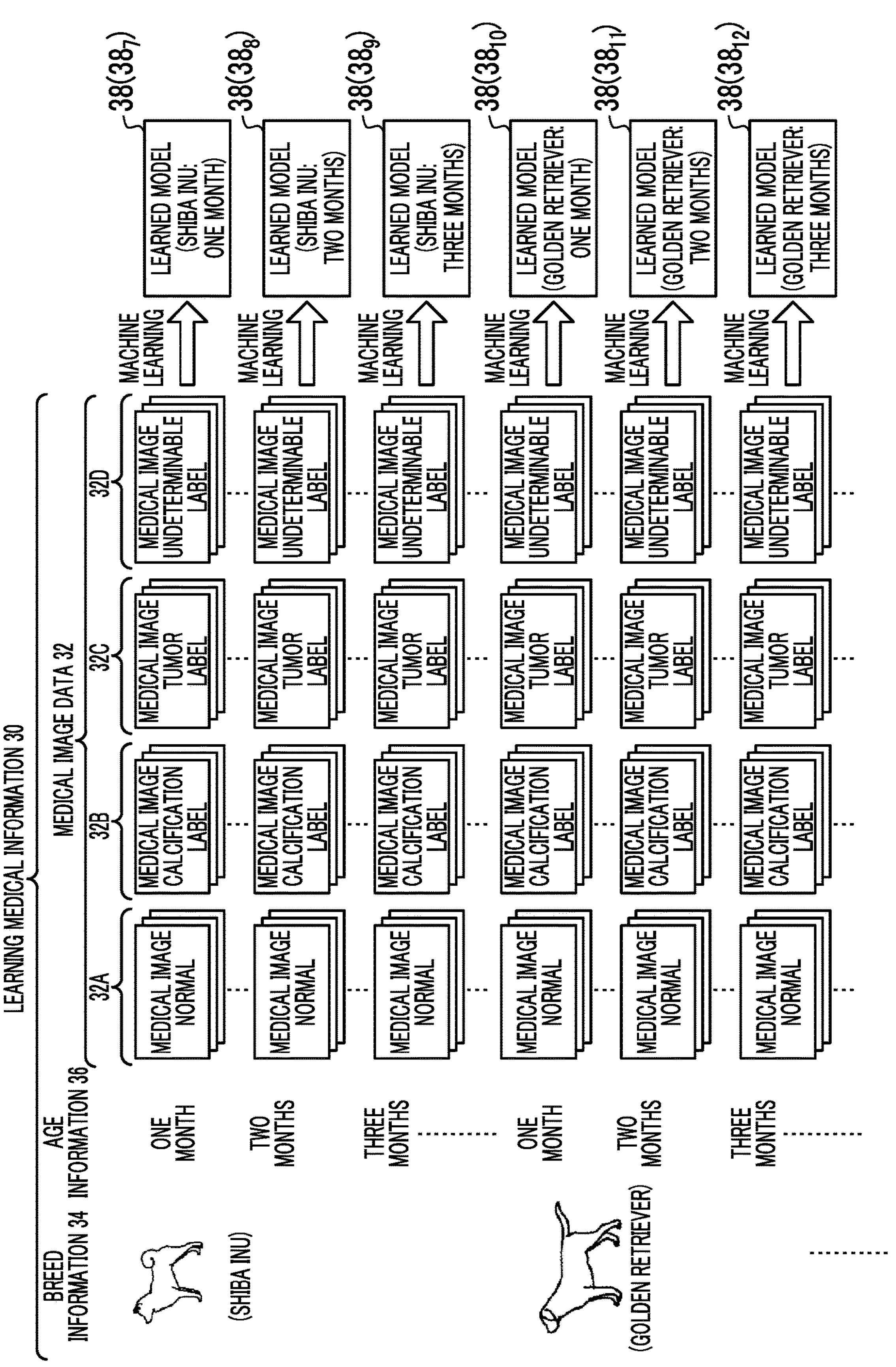
FIG. 15 is a diagram for describing a learned model according to the second embodiment.

As shown in FIG. 15, the learned model 38 according to the present embodiment is generated by machine learning using the learning medical information 30 according to the present embodiment. For example, in a case where the dog breed represented by the breed information 34 is "Shiba Inu", a learned model $\mathbf{38}_7$ for which the dog breed is Shiba Inu and the age is one month is generated from the medical image data 32A to 32D whose age represented by the age information 36 is "one month", as shown in FIG. 15. A learned model $\mathbf{38}_8$ for which the dog breed is Shiba Inu and the age is two months is generated from the medical image data 32A to 32D whose age represented by the age information 36 is "two months". A learned model $\mathbf{38}_9$ for which the dog breed is Shiba Inu and the age is three months is generated from the medical image data 32A to 32D whose age represented by the age information 36 is "three months".

For example, in a case where the dog breed represented by the breed information 34 is "Golden Retriever", a learned model $\mathbf{38}_{10}$ for which the dog breed is Golden Retriever and the age is one month is generated from the medical image data 32A to 32D whose age represented by the age information 36 is "one month", as shown in FIG. 15. A learned model $\mathbf{38}_{11}$ for which the dog breed is Golden Retriever and the age is two months is generated from the medical image data 32A to 32D whose age represented by the age information 36 is "two months". A learned model $\mathbf{38}_{12}$ for which the dog breed is Golden Retriever and the age is three months is generated from the medical image data 32A to 32D whose age represented by the age information 36 is "three months". As described above, an example of the learned model 38 includes a neural network model.

FIG. 15 shows the six learned models $\mathbf{38}_7$ to $\mathbf{38}_{12}$, but the number of learned models 38 to be generated is not limited to six. In a case where the learned models $\mathbf{38}_7$ to $\mathbf{38}_{12}$ are collectively referred to without distinction, the symbols "7" to "12" for distinguishing the individual models are omitted and the models are referred to as "learned model 38".

Next, a functional configuration of the medical care support device 10 according to the present embodiment in the learning phase will be described. The overall configuration of the medical care support device 10 according to the present embodiment in the learning phase is the same as that of the medical care support device 10 according to the first embodiment (refer to FIG. 7). On the other hand, there is a difference in a specific operation of the learning unit 52 in the medical care support device 10 according to the present embodiment for generating the learned model 38 based on the learning medical information 30. Therefore, the specific operation of the learning unit 52 will be described.

The learning unit 52 according to the present embodiment generates, by machine learning, a plurality of learned models 38 according to combinations of the breed and the age that receive the medical image data 32 and output any one of the information representing the degree of calcification, the information representing that the tumor is present, or the information representing that the undeterminable portion is present in the medical image 33 represented by the medical image data 32, for each combination of the dog breed represented by the breed information 34 and the age represented by the age information 36.

More specifically, in a case where the medical image data 32A and the medical image data 32B are input among the medical image data 32 to which "Shiba Inu" is added as the dog breed represented by the breed information 34 and "one month" is added as the age represented by the age information 36, the learning unit 52 causes the model to learn such that the information representing the degree of calcification is output. In a case where the medical image data 32C is input among the medical image data 32 to which "Shiba Inu" is added as the dog breed represented by the breed information 34 and "one month" is added as the age represented by the age information 36, the learning unit 52 causes the model to learn such that the information representing that the tumor is present is output. In a case where the medical image data 32D is input among the medical image data 32 to which "Shiba Inu" is added as the dog breed represented by the breed information 34 and "one month" is added as the age represented by the age information 36, the learning unit 52 causes the model to learn such that the information representing that the undeterminable portion is present is output. With the learning, the learned model $\mathbf{38}_7$ for which the dog breed is Shiba Inu and the age is one month is generated.

Similarly, in a case where the medical image data 32A and the medical image data 32B are input among the medical image data 32 to which "Shiba Inu" is added as the dog breed represented by the breed information 34 and "two months" is added as the age represented by the age information 36, the learning unit 52 causes the model to learn such that the information representing the degree of calcification is output. In a case where the medical image data 32C is input among the medical image data 32 to which "Shiba Inu" is added as the dog breed represented by the breed information 34 and "two months" is added as the age represented by the age information 36, the learning unit 52 causes the model to learn such that the information representing that the tumor is present is output. In a case where the medical image data 32D is input among the medical image data 32 to which "Shiba Inu" is added as the dog breed represented by the breed information 34 and "two months" is added as the age represented by the age information 36, the learning unit 52 causes the model to learn such that the information representing that the undeterminable portion is present is output. With the learning, the learned model $\mathbf{38}_8$ for which the dog breed is Shiba Inu and the age is two months is generated.

Similarly, in a case where the medical image data 32A and the medical image data 32B are input among the medical image data 32 to which "Golden Retriever" is added as the dog breed represented by the breed information 34 and "one month" is added as the age represented by the age information 36, the learning unit 52 causes the model to learn such that the information representing the degree of calcification is output. In a case where the medical image data 32C is input among the medical image data 32 to which "Golden Retriever" is added as the dog breed represented by the breed information 34 and "one month" is added as the age represented by the age information 36, the learning unit 52 causes the model to learn such that the information representing that the tumor is present is output. In a case where the medical image data 32D is input among the medical image data 32 to which "Golden Retriever" is added as the dog breed represented by the breed information 34 and "one month" is added as the age represented by the age information 36, the learning unit 52 causes the model to learn such that the information representing that the undeterminable portion is present is output. With the learning, the learned model $\mathbf{38}_{10}$ for which the dog breed is Golden Retriever and the age is one month is generated.

Figure 16:
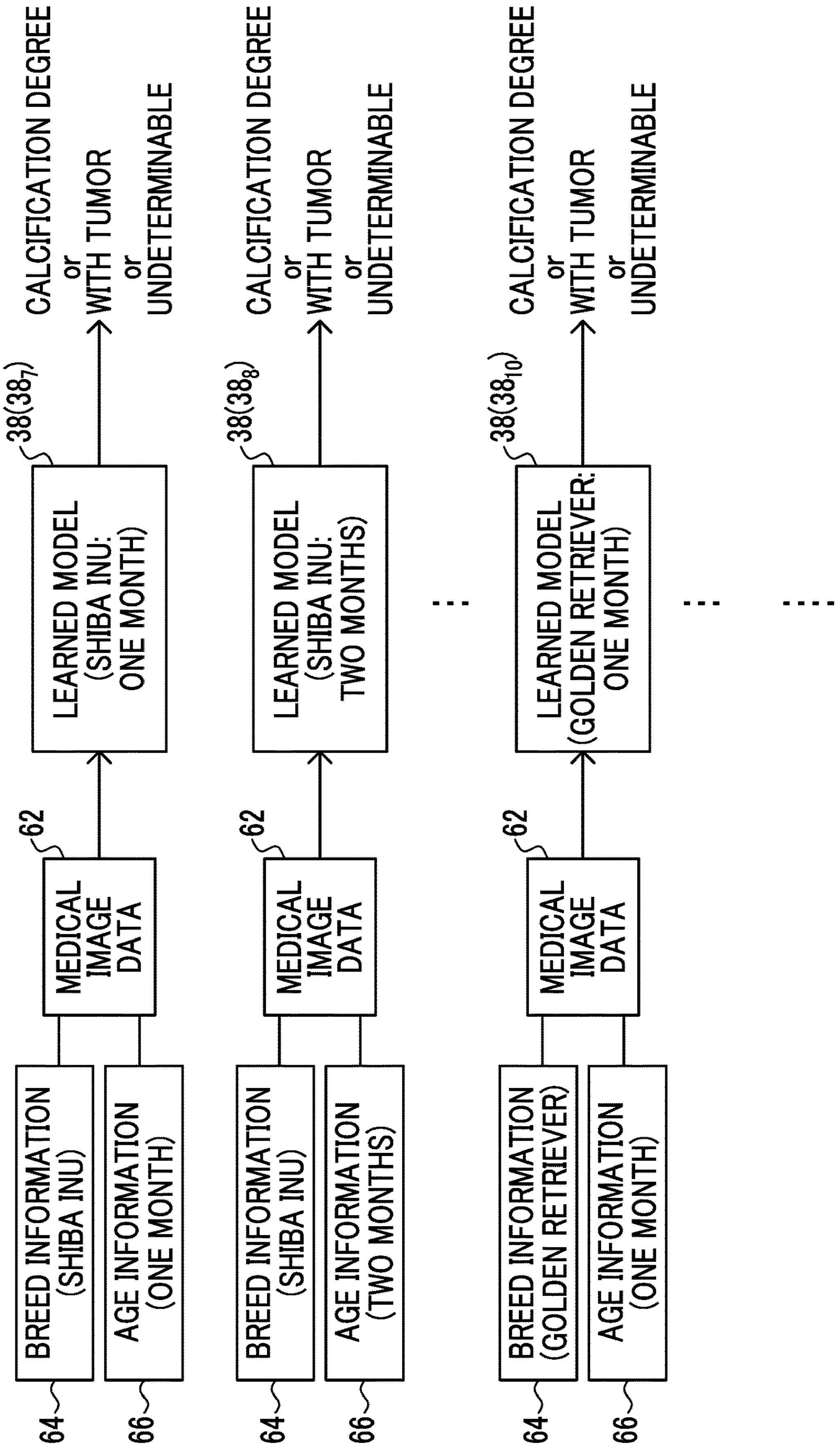
FIG. 16 is a diagram for describing an input and an output of the learned model according to the second embodiment.

For example, as described above, the error back propagation method may be employed as an algorithm of the learning by the learning unit 52 described above. As shown in FIG. 16 as an example, the learned model 38 is generated by the learning by the learning unit 52 described above, which receives the medical image data 62, the breed information 64, and the age information 66 and outputs the information representing any one of the degree of calcification, whether the tumor is present, or whether the undeterminable portion is present for the lung of the subject appearing in the medical image represented by the input medical image data 62, for each combination of the dog breed and the age. The learning unit 52 stores the generated learned model 38 in the storage unit 22. In a case where the information, output from the learned model 38, representing any one of the degree of calcification, whether the tumor is present, or whether the undeterminable portion is present in the lung of the subject is collectively referred to, the information is referred to as "information on lung".

An action of the medical care support device 10 according to the present embodiment in the learning phase, that is, the learning processing executed by the medical care support device 10 is the same as the learning processing (refer to FIG. 8) executed by the medical care support device 10 according to the first embodiment, and thus the description thereof is omitted.

Next, a functional configuration of the medical care support device 10 according to the present embodiment in the operation phase will be described with reference to FIG. 17.

A specific operation of the derivation unit 56 of the medical care support device 10 according to the present embodiment is different from that of the derivation unit 56 (refer to FIG. 10) of the medical care support device 10 according to the first embodiment. Therefore, the specific operation of the derivation unit 56 will be described.

The derivation unit 56 derives any one of the degree of calcification of the subject, the presence or absence of the tumor, or the presence or absence of the undeterminable portion, based on the medical information (the medical image data 62, the breed information 64, and the age information 66) acquired by the acquisition unit 54 and the learned model 38 learned in advance by the learning medical information 30. Hereinafter, any one of the degree of calcification of the subject, the presence or absence of the tumor, or the presence or absence of the undeterminable portion, which is derived by the derivation unit 56, may be referred to as "abnormality related to lung".

Specifically, the derivation unit 56 inputs the medical image data 62 acquired by the acquisition unit 54 to the learned model 38 according to the combination of the dog breed represented by the breed information 64 and the age represented by the age information 66 which are acquired by the acquisition unit 54. The learned model 38 outputs the information on the lung of the subject according to the input medical information.

In a case where the learned model 38 outputs the information representing the degree of calcification as the information on the lung of the subject, the derivation unit 56 determines whether or not the lung of the subject is normal, as in the first embodiment. In a case where the lung of the subject is determined to be normal, the derivation unit 56 outputs a derivation result representing that the lung of the subject is normal to the output unit 57, instead of the derived degree of calcification. In a case where the lung of the subject is determined to be abnormal, the derivation unit 56 outputs the information representing the derived degree of calcification to the output unit 57.

In a case where the learned model 38 outputs the information representing that the tumor is present as the information on the lung of the subject, the derivation unit 56 outputs the derivation result that the tumor is present to the output unit 57. In a case where the learned model 38 outputs the information representing that the undeterminable portion is present as the information on the lung of the subject, the derivation unit 56 outputs the derivation result that the undeterminable portion is present to the output unit 57.

Figure 17:
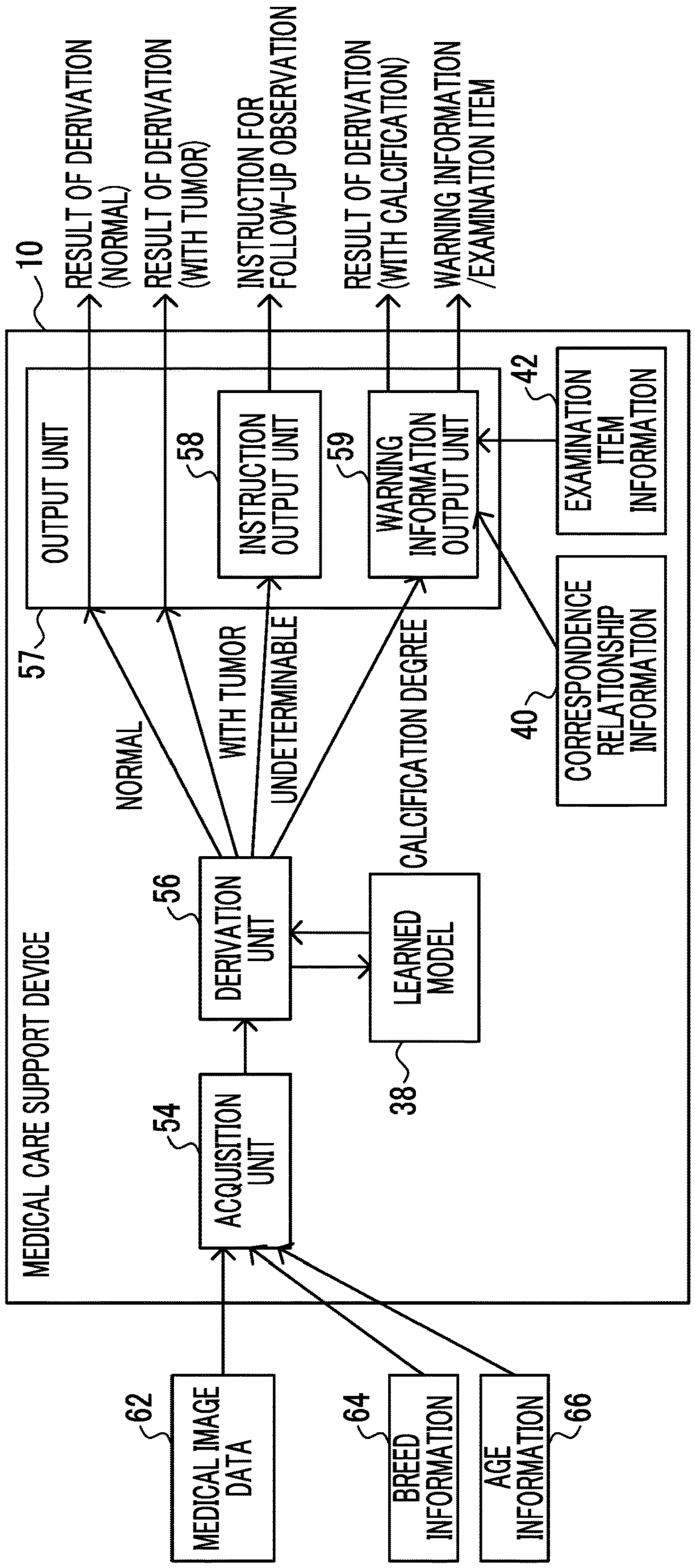
FIG. 17 is a block diagram showing an example of a functional configuration of a medical care support device according to the second embodiment in an operation phase.

As shown in FIG. 17, in the medical care support device 10 according to the present embodiment, the output unit 57 is different from the output unit 57 of the medical care support device 10 according to the first embodiment (refer to FIG. 10) in that an instruction output unit 58 is further included.

As described above, in a case where the derivation result that the lung of the subject is normal is input from the derivation unit 56, the output unit 57 outputs the derivation result that the lung thereof is normal. In a case where the degree of calcification is input from the derivation unit 56, the warning information output unit 59 of the output unit 57 outputs the information the warning information indicating a warning and the examination item in a case where the degree of calcification is larger than the reference degree of calcification and outputs the derivation result that the calcification is present in a case where the degree of calcification is equal to or less than the reference degree of calcification.

In a case where the derivation result that the tumor is present is input from the derivation unit 56, the output unit 57 according to the present embodiment outputs the derivation result that the tumor is present.

In a case where the derivation result that the undeterminable portion is present is input from the derivation unit 56, the instruction output unit 58 of the output unit 57 according to the present embodiment outputs information on an instruction for follow-up observation. As described above, the undeterminable portion in the present embodiment corresponds to a shadow that is unable to be determined whether it is due to any one of the calcification or the tumor. In a case where the shadow is due to the tumor, the shadow grows over time and becomes larger in size or changes in shape. At least the tumor grows faster over time than the calcification. Therefore, it is possible to determine whether the shadow is due to the tumor or the calcification by performing the follow-up observation of the shadow which is the undeterminable portion, specifically, the undeterminable portion in the medical image 33. Therefore, the instruction output unit 58 according to the present embodiment outputs the information on the instruction for follow-up observation and displays the instruction for follow-up observation on the display unit (not shown) of the terminal device 12. The user interprets the medical image represented by the medical image data 62 with reference to the instruction for follow-up observation displayed on the display unit of the terminal device 12 and performs the medical care based on the calcification of the lung of the subject. The user informs an owner, who is the owner of the dog which is the subject, of the fact that a return visit is required and a timing of the return visit. The instruction output unit 58 may display, on the display unit of the terminal device 12, the derivation result that the undeterminable portion is present, in addition to the information on the instruction for follow-up observation.

Figure 18:
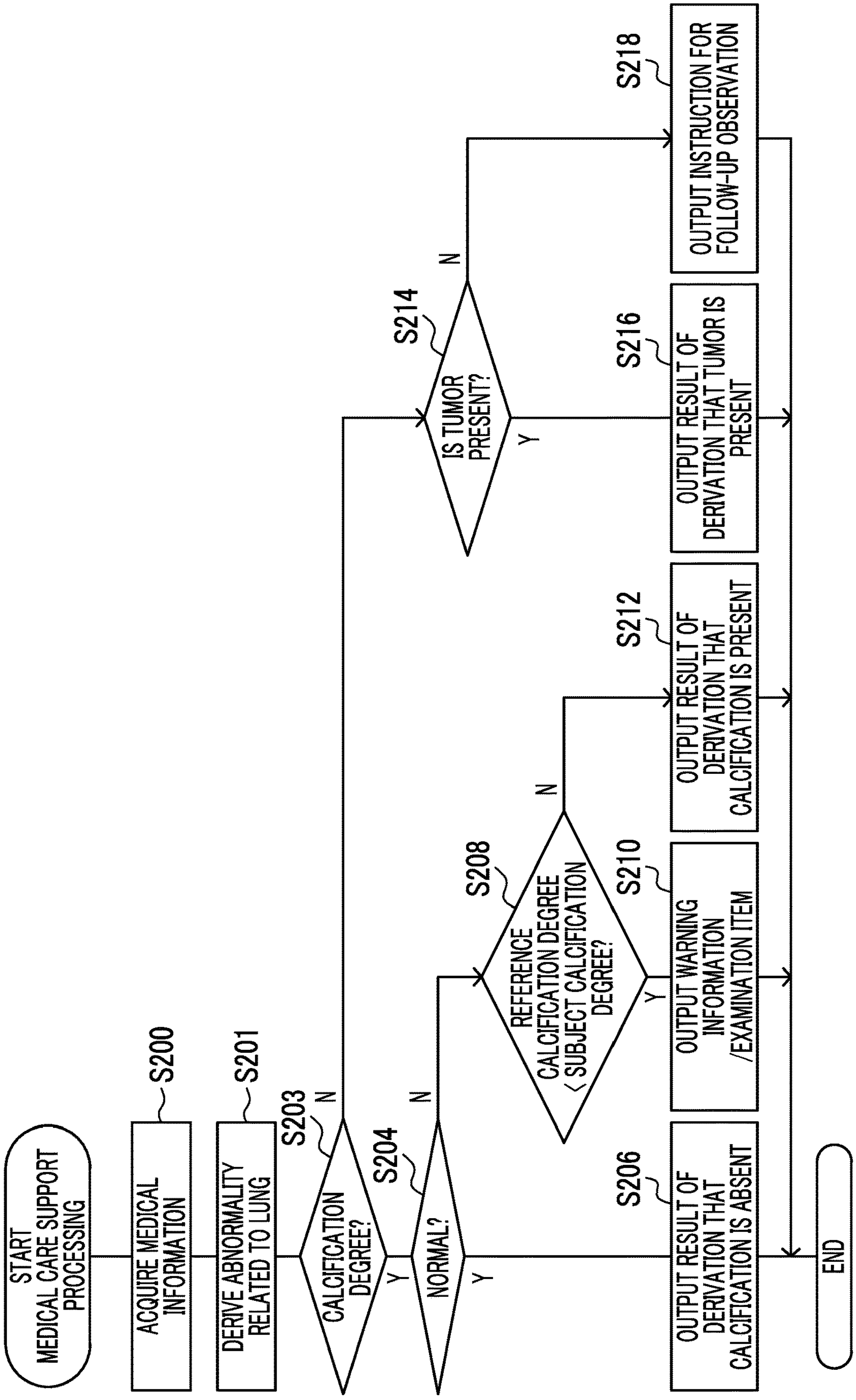
FIG. 18 is a flowchart showing an example of medical care support processing executed by the medical care support device according to the second embodiment.

Next, an action of the medical care support device 10 according to the present embodiment in the operation phase will be described. FIG. 18 is a flowchart showing an example of medical care support processing executed by the medical care support device 10 according to the present embodiment. As shown in FIG. 18, the medical care support processing according to the present embodiment is different from the medical care support processing (refer to FIG. 11) according to the first embodiment in that step S201 and step S203 are provided instead of step S202 and processing of steps S214 to S218 is further included.

In next step S201, the derivation unit 56 derives the abnormality related to the lung of the subject, based on the medical information input from the acquisition unit 54 and the learned model 38, as described above. Specifically, the derivation unit 56 inputs the medical image data 62 to the learned model 38 selected according to the combination of the breed information 64 and the age information 66 in the input medical information to acquire the information on the lung of the subject output from the learned model 38.

Figure 19:
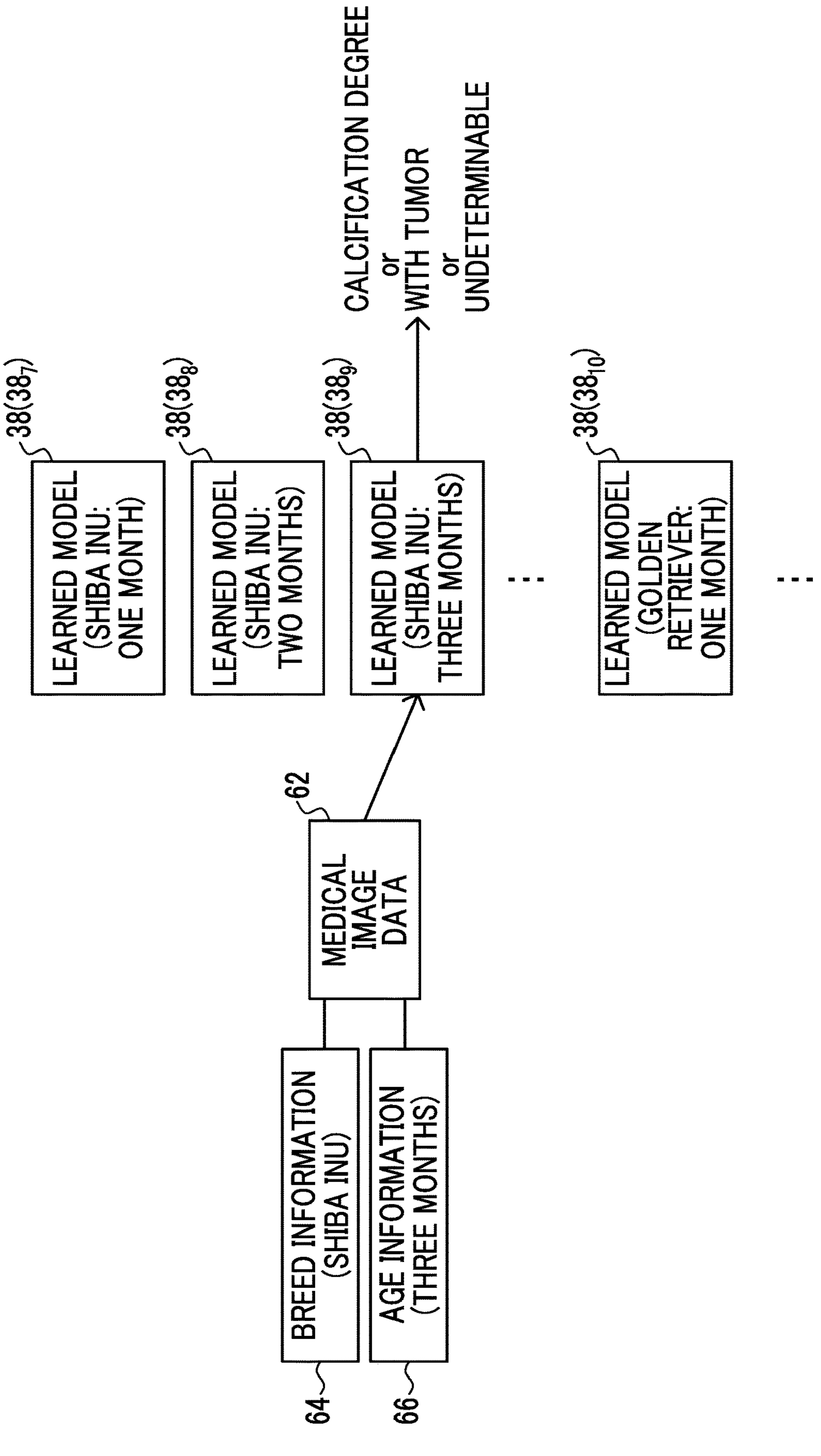
FIG. 19 is a diagram for describing information on the lung using the learned model according to a combination of a dog breed and an age in the medical care support device according to the second embodiment.

For example, as shown in FIG. 19, in a case where the dog breed represented by the breed information 64 in the medical information is "Shiba Inu" and the information represented by the age information 66 is "three months", the derivation unit 56 inputs the medical image data 62 to the learned model $\mathbf{38}_9$ for which the dog breed is Shiba Inu and the age is three months. The information on the lung of the subject is output from the learned model $\mathbf{38}_9$.

In next step S203, the derivation unit 56 determines whether or not the acquired information on the lung of the subject is the information representing the degree of calcification. In a case where the acquired information on the lung of the subject is the information representing the degree of calcification, the determination in step S203 is affirmative and the processing proceeds to step S204. On the other hand, in a case where the acquired information on the lung of the subject is not the information representing the degree of calcification, the determination in step S203 is negative and the processing proceeds to step S214.

In step S214, the derivation unit 56 determines whether or not the acquired information on the lung of the subject is the information representing that the tumor is present. In a case where the acquired information on the lung of the subject is the information representing that the tumor is present, the determination in step S214 is affirmative and the processing proceeds to step S216.

In step S216, the output unit 57 outputs the derivation result that there is the tumor in the lung of the subject as described above. In a case where the processing in step S216 ends, the medical care support processing ends.

On the other hand, in a case where the acquired information on the lung of the subject is not the information representing that the tumor is present, the determination in step S214 is negative and the processing proceeds to step S218. In this case, the acquired information on the lung of the subject is the information representing that the undeterminable portion is present. Therefore, in step S218, the output unit 57 outputs the information on the instruction for follow-up observation as described above. In a case where the processing in step S218 ends, the medical care support processing ends.

As described above, with the medical care support device 10 according to the present embodiment, whether the tumor is present or whether the undeterminable portion is present is derived for the lung of the subject, in addition to the degree of calcification. Therefore, with the medical care support device 10 according to the present embodiment, it is possible to further support the medical care related to the lung of the subject.

The learned model 38 used in the present embodiment is not limited to the above-described learned model 38 for each combination of the dog breed and the age. For example, a form may be employed in which the learned model 38 for deriving the degree of calcification, the learned model 38 for deriving the presence or absence of the tumor, and the learned model 38 for deriving the presence or absence of the undeterminable portion are provided.

In a case where two or more of the shadow of the calcification, the shadow of the tumor, and the shadow of the undeterminable portion are mixed in the medical image, the learned model 38 may be learned using the medical image data 32 of the medical image to which the label (calcification label 72, tumor label 74, or undeterminable label 76) corresponding to each shadow is assigned.

Third Embodiment

Hereinafter, a third embodiment will be described in detail.

An example of a factor affecting the calcification of the lung of the subject includes a body type of the subject. In the present embodiment, a form will be described in which the medical care support device 10 supports the medical care based on the calcification of the lung of the subject using the medical information including the body type of the subject.

A configuration of the medical care support system 1 according to the present embodiment is the same as the configuration of the medical care support system 1 according to the first embodiment (refer to FIG. 1), and a description thereof will be omitted.

Figure 20:
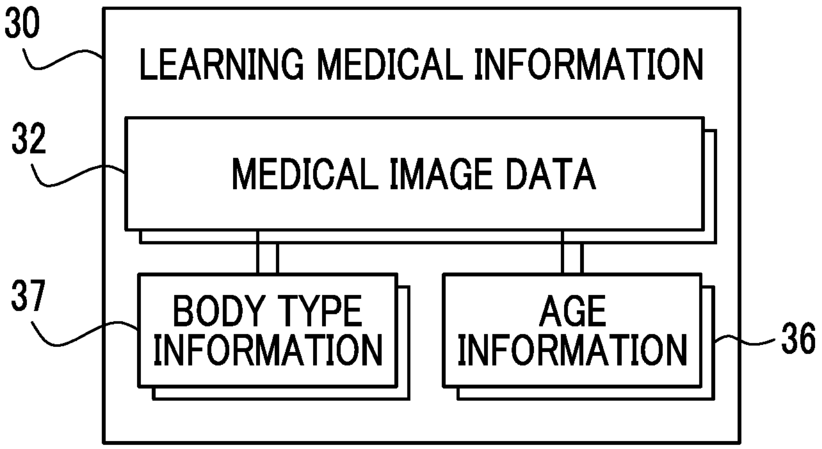
FIG. 20 is a diagram showing an example of learning medical information stored in a storage unit of a medical care support device according to a third embodiment.
Figure 21:
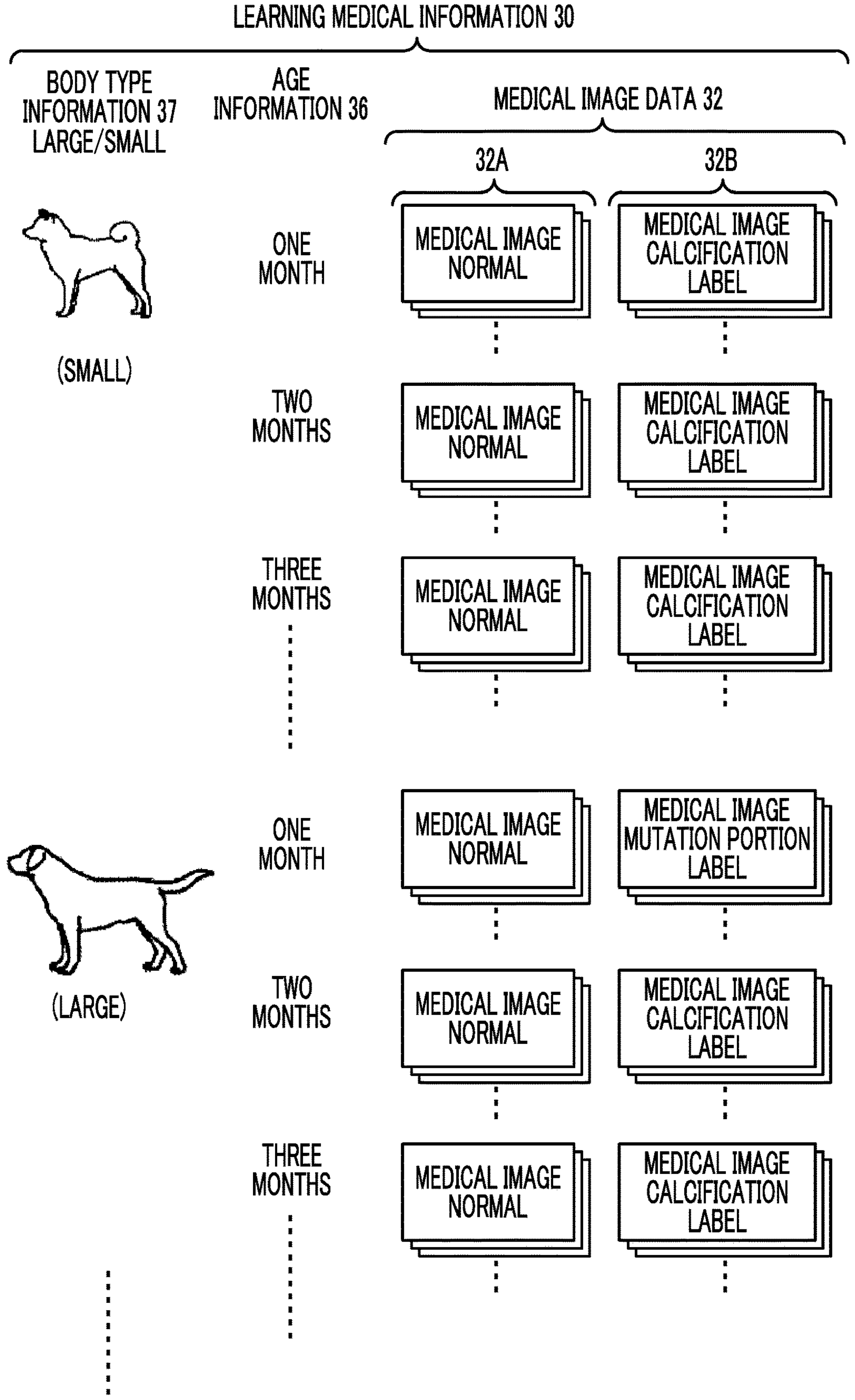
FIG. 21 is a diagram for describing an example of the learning medical information according to the third embodiment.

On the other hand, in the medical care support device 10 according to the present embodiment, the contents of the medical information of the subject used for the medical care and the contents of the learning medical information 30 used for learning the learned model 38 are different from those of the first embodiment. Therefore, in the configuration of the medical care support device 10 according to the present embodiment, information included in the learning medical information 30 stored in the storage unit 22 is different from the information (refer to FIGS. 2 and 3) included in the learning medical information 30 stored in the storage unit 22 according to the first embodiment. FIGS. 20 and 21 show an example of the learning medical information 30 according to the present embodiment. As shown in FIGS. 20 and 21, the learning medical information 30 according to the present embodiment includes body type information 37, instead of the breed information 34 (refer to FIGS. 2 and 3) included in the learning medical information 30 according to the first embodiment.

The body type information 37 is information representing the body type of the subject. Specifically, the body type information 37 is information representing a size of the body of the subject. As an example, in the present embodiment, the information is information representing the size of the body of the subject in two stages and, specifically, is information representing whether the body type is small or large. The body type information 37 is not limited to this embodiment and may be information representing the size of the body in three or more stages such as small, medium, and large.

A method of obtaining the body type information 37 is not particularly limited. For example, a form may be employed in which the user who interprets the medical image represented by the medical image data 32 inputs the body type from an operation unit (not shown) of the terminal device 12. For example, a form may be employed in which a table representing a correspondence relationship between the dog breed and the body type is prepared in advance, the dog breed of the subject is acquired from an electronic medical record or the like, and the body type corresponding to the acquired dog breed is acquired from the table prepared in advance. For example, a form may be employed in which the body type of the subject is automatically acquired from a comparison result of comparing sizes of an examination table and the subject based on a captured image obtained by capturing the subject on the examination table with a camera or the like.

Figure 22:
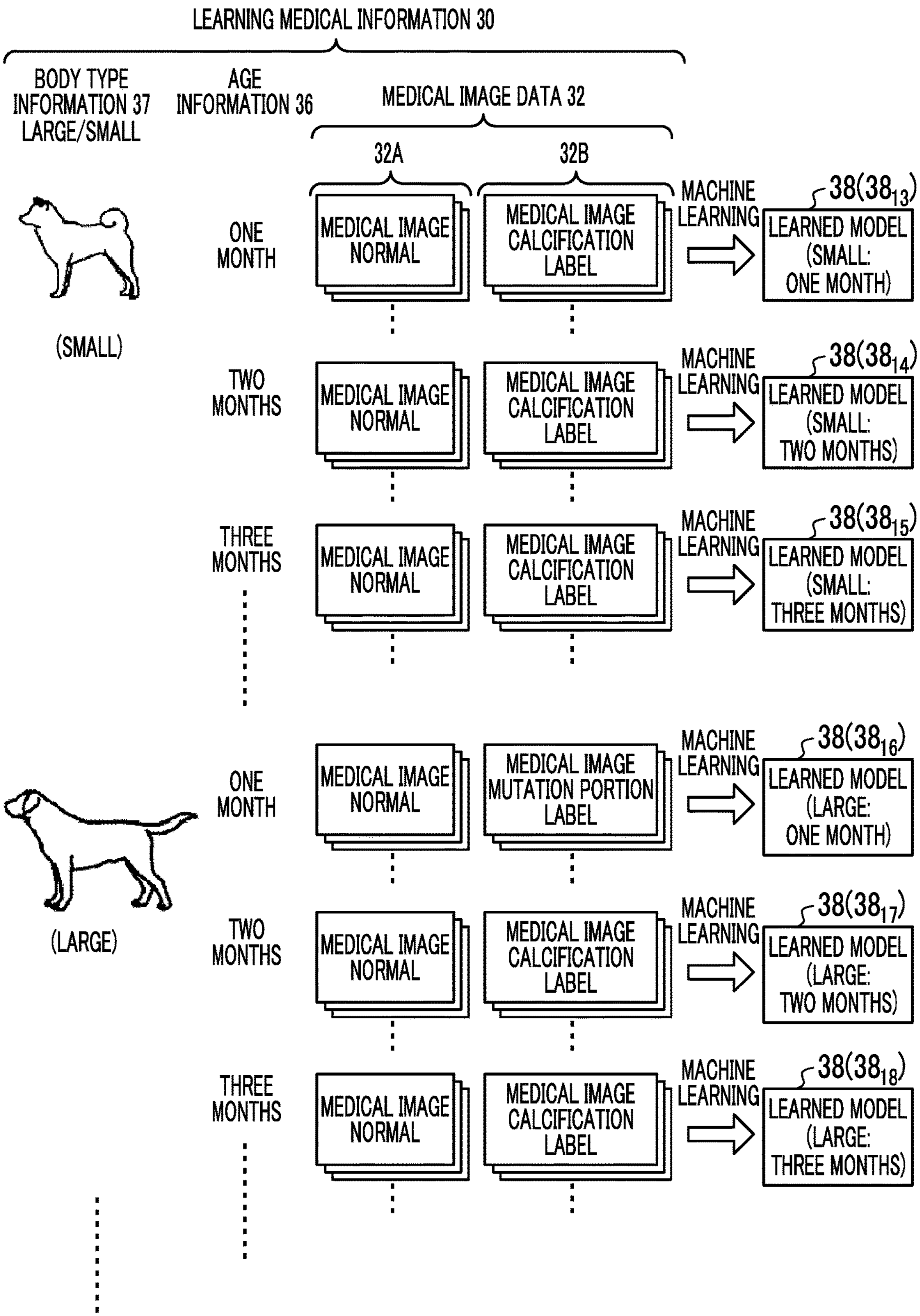
FIG. 22 is a diagram for describing a learned model according to the third embodiment.

As shown in FIG. 22, the learned model 38 according to the present embodiment is generated by machine learning using the learning medical information 30 according to the present embodiment. For example, in a case where the body type represented by the body type information 37 is “small”, a learned model $38_{13}$ for which the body type is small and the age is one month is generated from the medical image data 32A and 32B whose age represented by the age information 36 is “one month”, as shown in FIG. 22. A learned model $38_{14}$ for which the body type is small and the age is two months is generated from the medical image data 32A and 32B whose age represented by the age information 36 is “two months”. A learned model $38_{15}$ for which the body type is small and the age is three months is generated from the medical image data 32A and 32B whose age represented by the age information 36 is “three months”.

For example, in a case where the body type represented by the body type information 37 is “large”, a learned model $38_{16}$ for which the body type is large and the age is one month is generated from the medical image data 32A and 32B whose age represented by the age information 36 is “one month”, as shown in FIG. 22. A learned model $\mathbf{38}_{17}$ for which the body type is large and the age is two months is generated from the medical image data 32A and 32B whose age represented by the age information 36 is “two months”. A learned model $\mathbf{38}_{18}$ for which the body type is large and the age is three months is generated from the medical image data 32A and 32B whose age represented by the age information 36 is “three months”. As described above, an example of the learned model 38 includes a neural network model.

FIG. 22 shows the six learned models $\mathbf{38}_{13}$ to $\mathbf{38}_{18}$, the number of learned models 38 to be generated is not limited to six. In a case where the learned models $\mathbf{38}_{13}$ to $\mathbf{38}_{18}$ are collectively referred to without distinction, the symbols “13” to “18” for distinguishing the individual models are omitted and the models are referred to as “learned model 38”.

Figure 23:
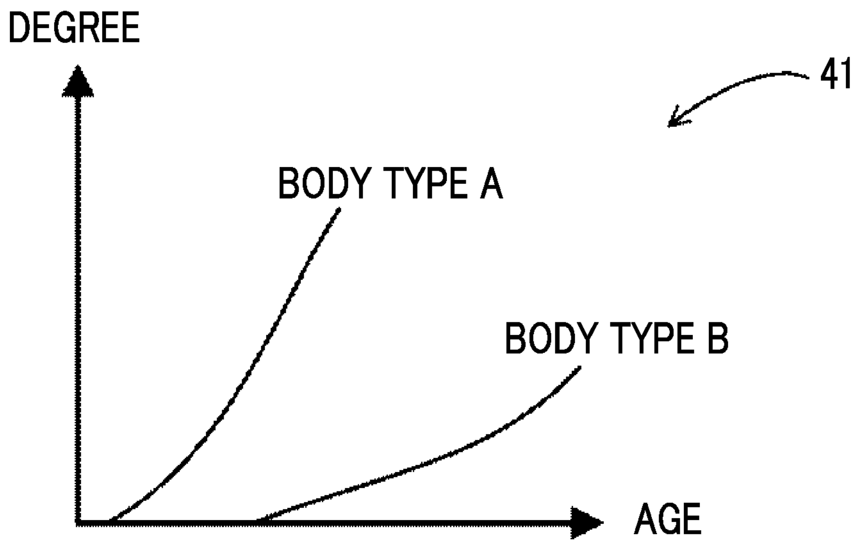
FIG. 23 is a diagram showing an example of correspondence relationship information representing a correspondence relationship between a body type, an age, and a degree of calcification of the lung.

The storage unit 22 according to the present embodiment is different in that the correspondence relationship information 41 shown in FIG. 23 as an example is stored, instead of the correspondence relationship information 41 (refer to FIGS. 2 and 6) of the first embodiment. The correspondence relationship information 41 is information representing a correspondence relationship between the body type, the age, and the degree of calcification of the lung. A body type A shown in FIG. 23 is one of the large type and the small type, and a body type B is the other of the large type and the small type. The correspondence relationship information 41 shown in FIG. 23 shows the correspondence relationship between age and the degree of calcification of the lung for each of the body type A that is easily calcified and the body type B that is not easily calcified. In the present embodiment, the degree of calcification of the lung represented by the correspondence relationship information 41 according to the age of each body type is also referred to as “reference degree of calcification”. That is, the reference degree of calcification refers to the degree of age-correspondent calcification in the body type.

Next, a functional configuration of the medical care support device 10 according to the present embodiment in the learning phase will be described. The overall configuration of the medical care support device 10 according to the present embodiment in the learning phase is the same as that of the medical care support device 10 according to the first embodiment (refer to FIG. 7). On the other hand, there is a difference in a specific operation of the learning unit 52 in the medical care support device 10 according to the present embodiment for generating the learned model 38 based on the learning medical information 30. Therefore, the specific operation of the learning unit 52 will be described.

The learning unit 52 according to the present embodiment generates, by machine learning, a plurality of learned models 38 according to combinations of the body type and the age that receive the medical image data 32 and output the information representing the degree of calcification in the medical image 33 represented by the medical image data 32, for each combination of the body type of the subject represented by the body type information 37 and the age represented by the age information 36.

More specifically, in a case where the medical image data 32 to which “small” is added as the body type represented by the body type information 37 and “one month” is added as the age represented by the age information 36 is input, the learning unit 52 causes the model to learn such that the information representing the degree of calcification is output. With the learning, the learned model $\mathbf{38}_{13}$ for which the body type is small and the age is one month is generated.

Similarly, in a case where the medical image data 32 to which “small” is added as the body type represented by the body type information 37 and “two months” as the age represented by the age information 36 is input, the learning unit 52 causes the model to learn such that the information representing the degree of calcification is output. With the learning, the learned model $\mathbf{38}_{14}$ for which the body type is small and the age is two months is generated.

Similarly, in a case where the medical image data 32 to which “large” is added as the body type represented by the body type information 37 and “one month” as the age represented by the age information 36 is input, the learning unit 52 causes the model to learn such that the information representing the degree of calcification is output. With the learning, the learned model $\mathbf{38}_{16}$ for which the body type is large and the age is one month is generated.

Figure 24:
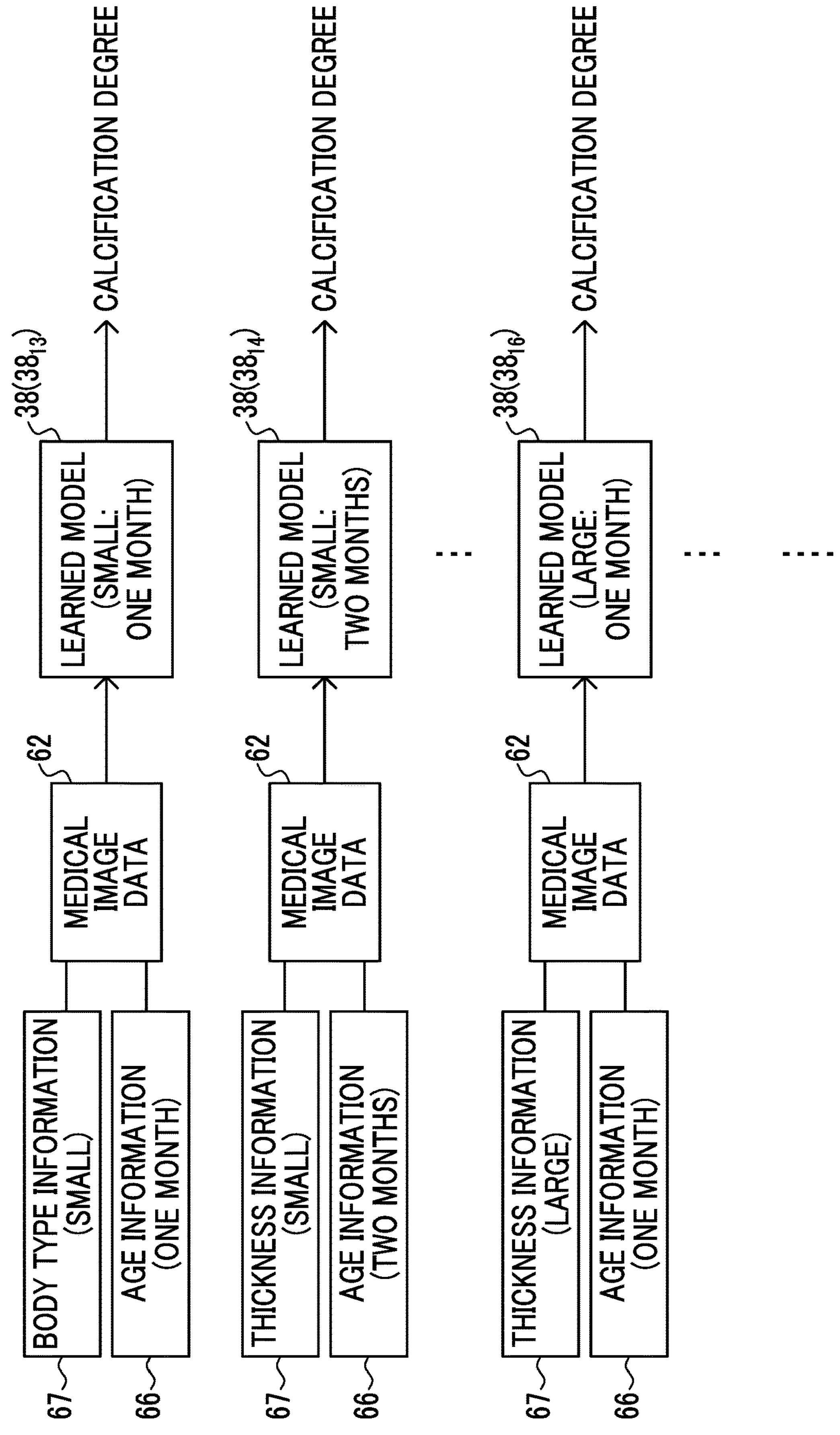
FIG. 24 is a diagram for describing an input and an output of the learned model according to the third embodiment.

For example, as described above, the error back propagation method may be employed as an algorithm of the learning by the learning unit 52 described above. As shown in FIG. 24 as an example, the learned model 38 is generated by the learning by the learning unit 52 described above, which receives the medical image data 62, body type information 67, and the age information 66 for each combination of the body type and the age and outputs the information representing the degree of calcification for the calcification of the lung of the subject appearing in the medical image represented by the input medical image data 62, for each combination of the body type and the age. The learning unit 52 stores the generated learned model 38 in the storage unit 22.

An action of the medical care support device 10 according to the present embodiment in the learning phase, that is, the learning processing executed by the medical care support device 10 is the same as the learning processing (refer to FIG. 8) executed by the medical care support device 10 according to the first embodiment, and thus the description thereof is omitted.

Figure 25:
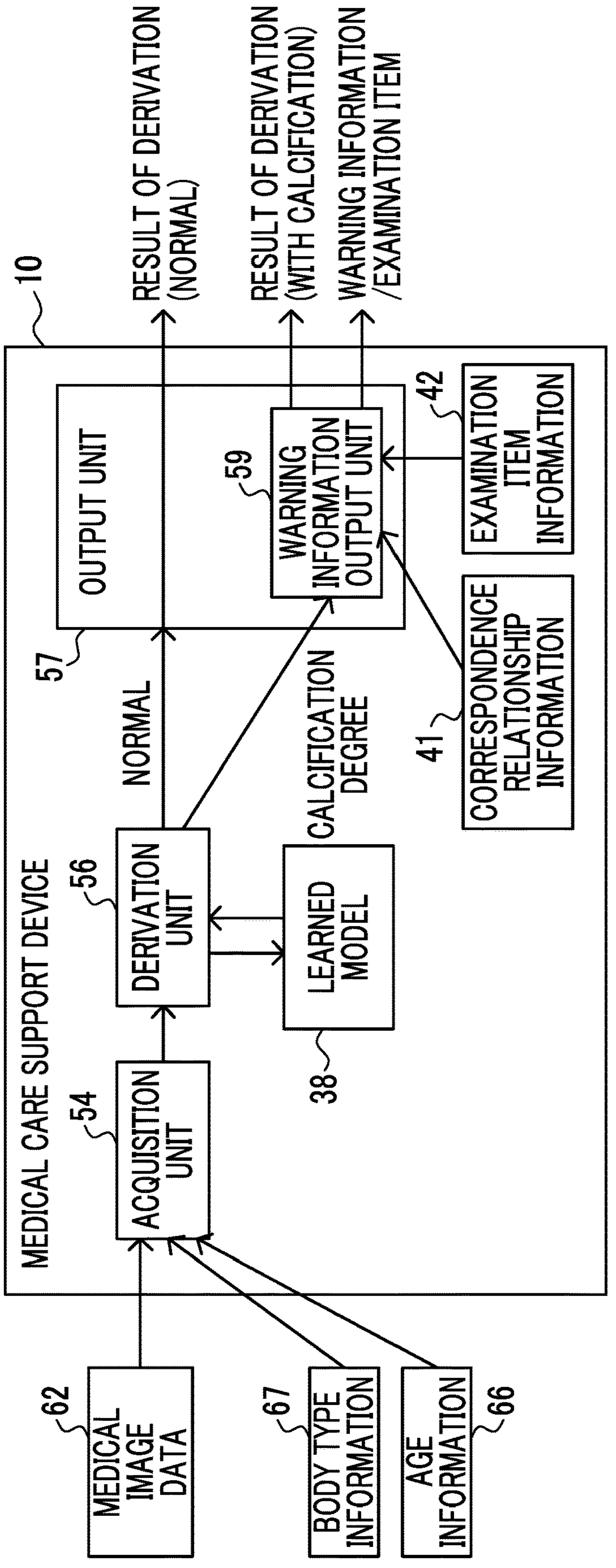
FIG. 25 is a block diagram showing an example of a functional configuration of the medical care support device according to the third embodiment in an operation phase.

Next, a functional configuration of the medical care support device 10 according to the present embodiment in the operation phase will be described with reference to FIG. 25. Specific operations of the acquisition unit 54 and the derivation unit 56 in the medical care support device 10 according to the present embodiment are different from the medical care support device 10 (refer to FIG. 10) according to the first embodiment. Therefore, the specific operations of the acquisition unit 54 and the derivation unit 56 will be described.

The acquisition unit 54 acquires the medical image data 62 representing the medical image obtained by capturing the subject, the body type information 67 representing the body type of the subject, and the age information 66 representing the age of the subject as the medical information. Each of the body type information 67 and the age information 66 may be added to the medical image data 62 or may be input by the user through the operation unit (not shown) of the terminal device 12.

The derivation unit 56 derives the degree of calcification of the subject, based on the medical information (medical image data 62, body type information 67, and age information 66) acquired by the acquisition unit 54 and the learned model 38 learned in advance by the learning medical information 30. Specifically, the derivation unit 56 inputs the medical image data 62 acquired by the acquisition unit 54 to the learned model 38 according to the combination of the body type represented by the body type information 67 and the age represented by the age information 66 which are acquired by the acquisition unit 54. The learned model 38 outputs the information representing the degree of calcification of the subject according to the input medical information.

Next, an action of the medical care support device 10 according to the present embodiment in the operation phase will be described. The overall flow of the medical care support processing is the same as the medical care support processing shown in FIG. 11 according to the first embodiment and thus will be described with reference to FIG. 11.

In step S200, the acquisition unit 54 acquires the medical information of the dog which is the subject and outputs the medical information to the derivation unit 56. Specifically, the acquisition unit 54 acquires the medical image data 62 representing the medical image obtained by capturing the dog of the subject which is the medical care target by the user using the medical image capturing device, the body type information 67 representing the body type of the subject, and the age information 66 representing the age of the subject.

In next step S202, the derivation unit 56 derives the degree of calcification of the subject, based on the medical information input from the acquisition unit 54 and the learned model 38, as described above. Specifically, the derivation unit 56 inputs the medical image data 62 to the learned model 38 selected according to the combination of the body type information 67 and the age information 66 in the input medical information to acquire the information representing the degree of calcification of the subject output from the learned model 38.

Figure 26:
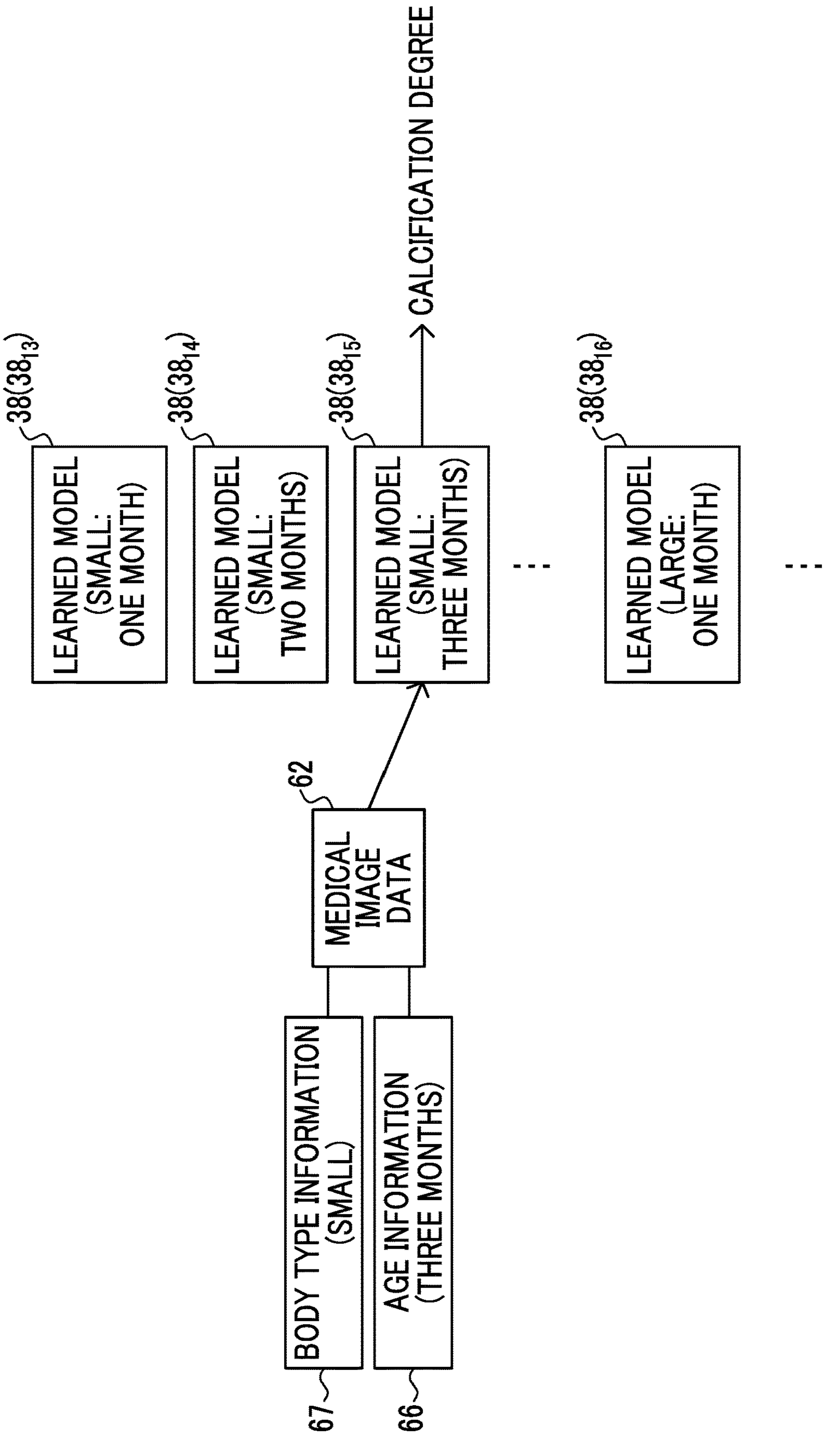
FIG. 26 is a diagram for describing derivation of a degree of calcification using the learned model according to a combination of the body type and the age in the medical care support device according to the third embodiment.

For example, as shown in FIG. 26, in a case where the body type represented by the body type information 67 in the medical information is "small" and the information represented by the age information 66 is "three months", the derivation unit 56 inputs the medical image data 62 to the learned model $\mathbf{38}_{15}$ for which the body type is small and the age is three months. The information representing the degree of calcification of the subject is output from the learned model $\mathbf{38}_{15}$.

In next step S204, the derivation unit 56 determines whether or not the lung of the subject is normal as described above. In a case where the lung of the subject is normal, the determination in step S204 is affirmative, and in next step S206, the output unit 57 outputs the derivation result that the lung of the subject is normal as described above and then the medical care support processing ends.

On the other hand, in a case where the lung of the subject is abnormal, the determination in step S204 is negative, and in next step S208, the warning information output unit 59 refers to the correspondence relationship information 41 as described above and determines whether or not the degree of calcification of the subject is larger than the reference degree of calcification (reference degree of calcification<degree of calcification of subject).

In a case where the degree of calcification of the subject is larger than the reference degree of calcification, the determination in step S208 is affirmative, and in next step S210, the warning information output unit 59 outputs the information representing the warning information and the examination item as described above and then the medical care support processing ends. On the other hand, in a case where the degree of calcification of the subject is equal to or less than the reference degree of calcification, the determination in step S210 is negative, and in next step S212, the warning information output unit 59 outputs the derivation result that the calcification is present as described above and then the medical care support processing ends.

Modification Example

The case where the body type represented by the body type information 37 is the small dog and the large dog is described above, but the "body type" is not limited to this form. In this modification example, a form in which a head species of the dog is used as the body type will be described as an example of the "body type".

Figure 27:
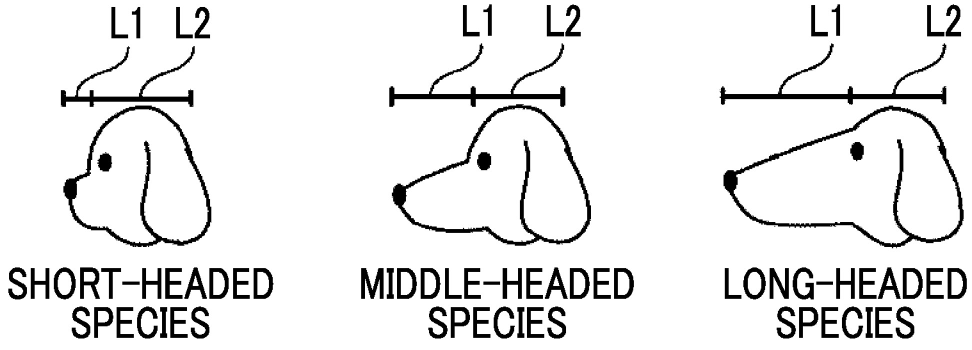
FIG. 27 is a diagram for describing a head species which is a modification example of the body type.

In dogs, a "head species" is a kind that is determined according to a length of the nose and a length of the skull. In this modification example, a form will be described in which an example of the "head species" is a short-headed species, a middle-headed species, or a long-headed species. As shown in FIG. 27, the short-headed species according to the present embodiment means a dog having a nose length L1 shorter than a skull length L2. The long-headed species means a dog having a nose length L1 longer than a skull length L2. The middle-headed species means a dog having the same nose length L1 and skull length L2. It may be the middle-headed species in a case where a difference between the length L1 of the nose and the length L2 of the skull is within a range of an allowable error even though the length L1 of the nose and the length L2 of the skull are not completely the same. The "head species" is not limited to this modification example and may be, for example, two kinds of the short-headed species or the long-headed species, or four or more kinds.

Figure 28:
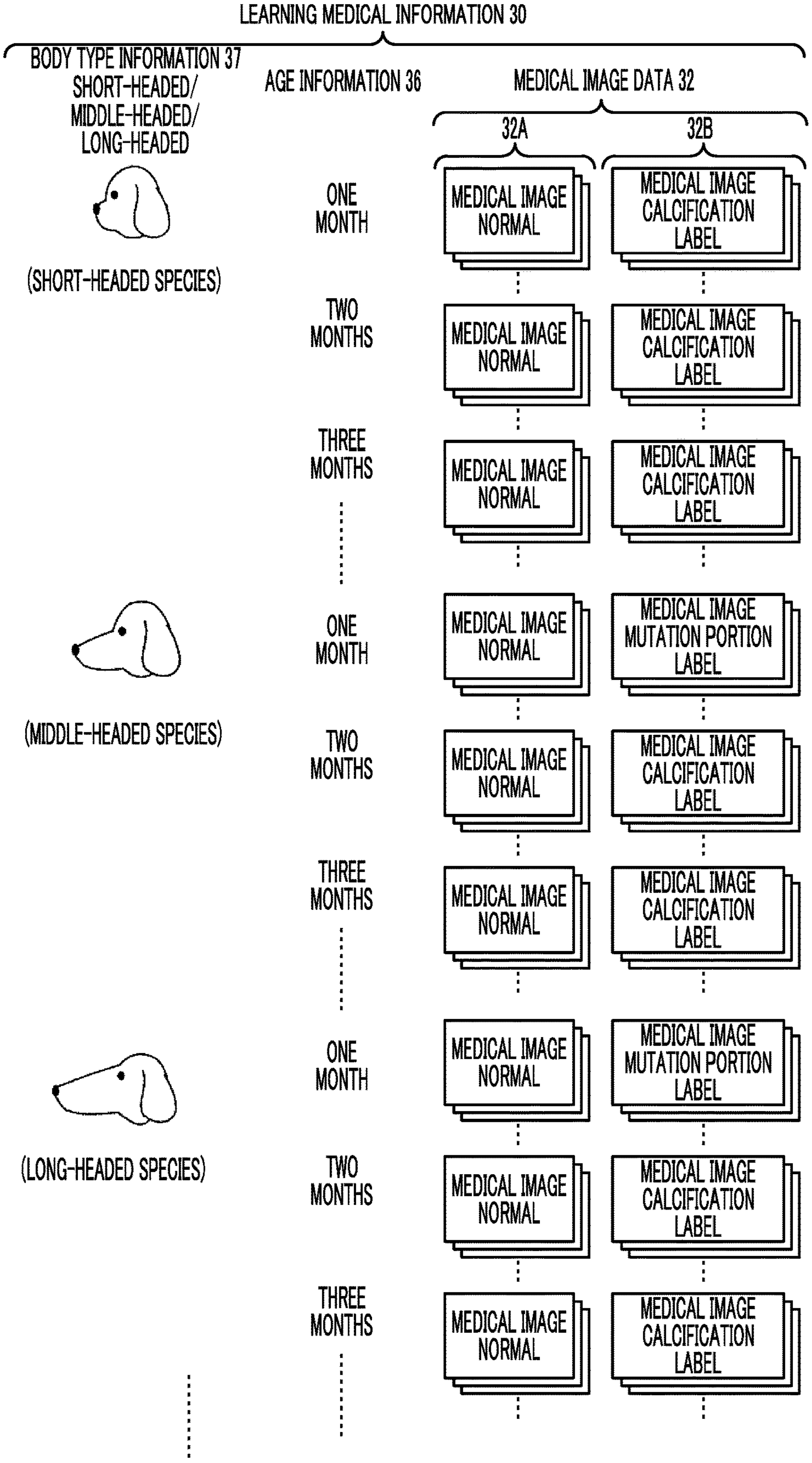
FIG. 28 is a diagram for describing an example of learning medical information according to the modification example.

As shown in FIG. 28, in the learning medical information 30 according to the present modification example, the body type information 37 included in the learning medical information 30 of the above embodiment is information representing a head species as the body type, and specifically, information representing any one of the short-headed species, the middle-headed species, or the long-headed species.

Figure 29:
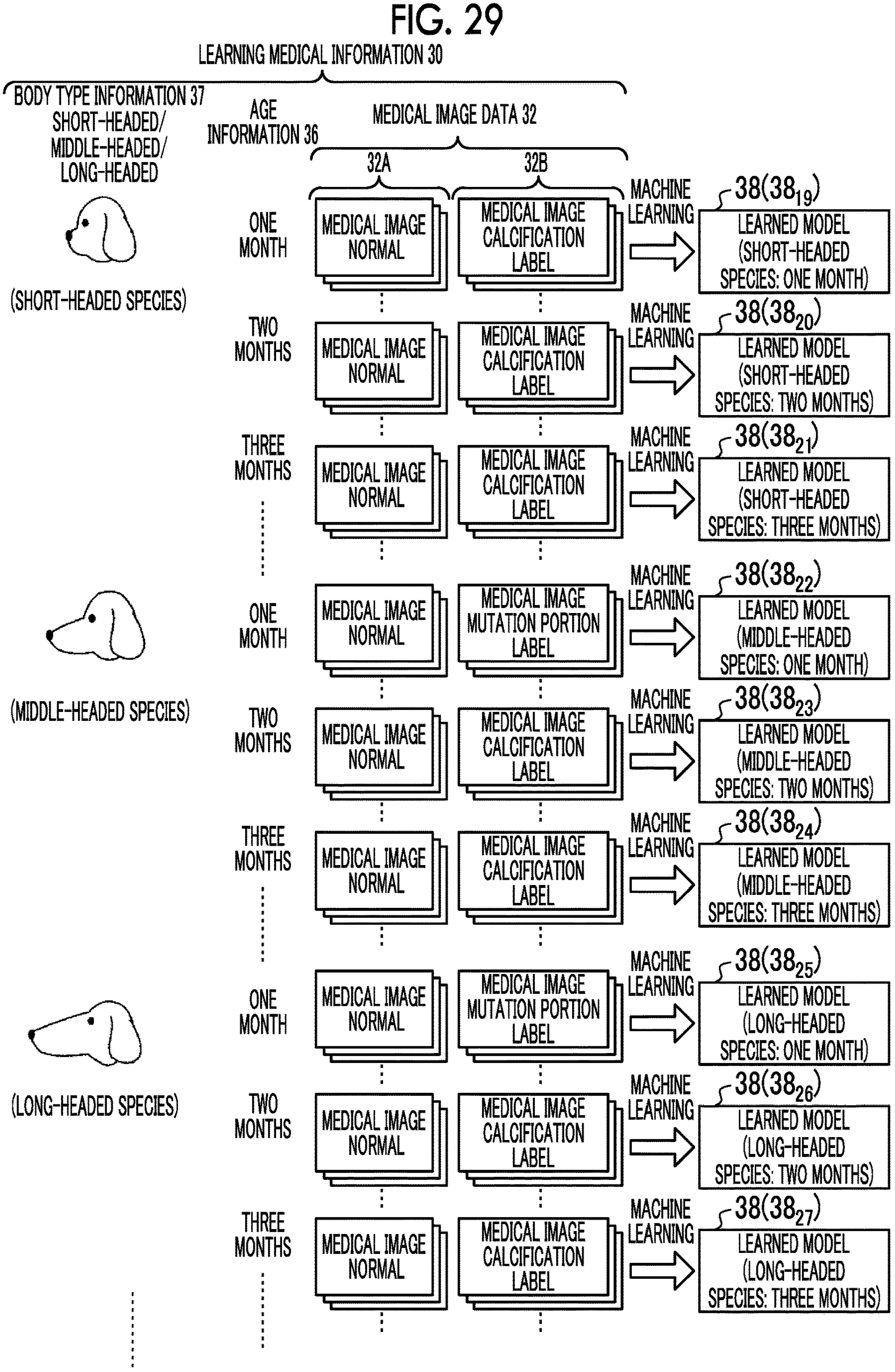
FIG. 29 is a diagram for describing a learned model according to the modification example.

As shown in FIG. 29, the learned model 38 according to the present embodiment is generated by machine learning using the learning medical information 30 according to the present embodiment. For example, in a case where the body type represented by the body type information 37 is "short-headed species", a learned model $\mathbf{38}_{19}$ for which the body type is the short-headed species and the age is one month is generated from the medical image data 32A and 32B whose age represented by the age information 36 is "one month", as shown in FIG. 29. A learned model $\mathbf{38}_{20}$ for which the body type is the short-headed species and the age is two months is generated from the medical image data 32A and 32B whose age represented by the age information 36 is "two months". A learned model $\mathbf{38}_{21}$ for which the body type is the short-headed species and the age is three months is generated from the medical image data 32A and 32B whose age represented by the age information 36 is "three months".

For example, in a case where the body type represented by the body type information 37 is "middle-headed species", a learned model $\mathbf{38}_{22}$ for which the body type is the middle-headed species and the age is one month is generated from the medical image data 32A and 32B whose age represented by the age information 36 is "one month", as shown in FIG. 29. A learned model $\mathbf{38}_{23}$ for which the body type is the middle-headed species and the age is two months is generated from the medical image data 32A and 32B whose age represented by the age information 36 is "two months". A learned model $\mathbf{38}_{24}$ for which the body type is the middle-headed species and the age is three months is generated from the medical image data 32A and 32B whose age represented by the age information 36 is "three months".

For example, in a case where the body type represented by the body type information 37 is "long-headed species", a learned model $38_{25}$ for which the body type is the long-headed species and the age is one month is generated from the medical image data 32A and 32B whose age represented by the age information 36 is "one month", as shown in FIG. 29. A learned model $38_{26}$ for which the body type is the long-headed species and the age is two months is generated from the medical image data 32A and 32B whose age represented by the age information 36 is "two months". A learned model $38_{27}$ for which the body type is the long-headed species and the age is three months is generated from the medical image data 32A and 32B whose age represented by the age information 36 is "three months".

FIG. 29 shows the nine learned models $38_{19}$ to $38_{27}$, but the number of learned models 38 to be generated is not limited to nine. In a case where the learned models $38_{19}$ to $38_{27}$ are collectively referred to without distinction, the symbols "19" to "27" for distinguishing the individual models are omitted and the models are referred to as "learned model 38".

The correspondence relationship information 41 stored in the storage unit 22 of the medical care support device 10 according to the present modification example is the information representing the correspondence relationship between the body type, the age, and the degree of calcification of the lung, as in the correspondence relationship information 41 described above. Specifically, the correspondence relationship information 41 is information indicating the degree of calcification of the lung according to age in each of the short-headed species, the middle-headed species, and the long-headed species.

A specific operation of the learning unit 52 in the medical care support device 10 according to the present modification example to generate the learned model 38 based on the learning medical information 30 is as follows.

In a case where the medical image data 32 to which the "short-headed species" is added as the body type represented by the body type information 37 and "one month" is added as the age represented by the age information 36 is input, the learning unit 52 causes the model to learn such that the information representing the degree of calcification is output. With the learning, the learned model $38_{19}$ for which the body type is the short-headed species and the age is one month is generated.

Similarly, in a case where the medical image data 32 to which the "short-headed species" is added as the body type represented by the body type information 37 and "two months" is added as the age represented by the age information 36 is input, the learning unit 52 causes the model to learn such that the information representing the degree of calcification is output. With the learning, the learned model $38_{20}$ for which the body type is the short-headed species and the age is two months is generated.

Similarly, in the case where the medical image data 32 to which the "middle-headed species" is added as the body type represented by the body type information 37 and "one month" is added as the age represented by the age information 36 is input, the learning unit 52 causes the model to learn such that the information representing the degree of calcification is output. With the learning, the learned model $38_{22}$ for which the body type is the middle-headed species and the age is one month is generated.

Similarly, in a case where the medical image data 32 to which the "long-headed species" is added as the body type represented by the body type information 37 and "one month" is added as the age represented by the age information 36 is input, the learning unit 52 causes the model to learn such that the information representing the degree of calcification is output. With the learning, the learned model $38_{25}$ for which the body type is the long-headed species and the age is one month is generated.

Figure 30:
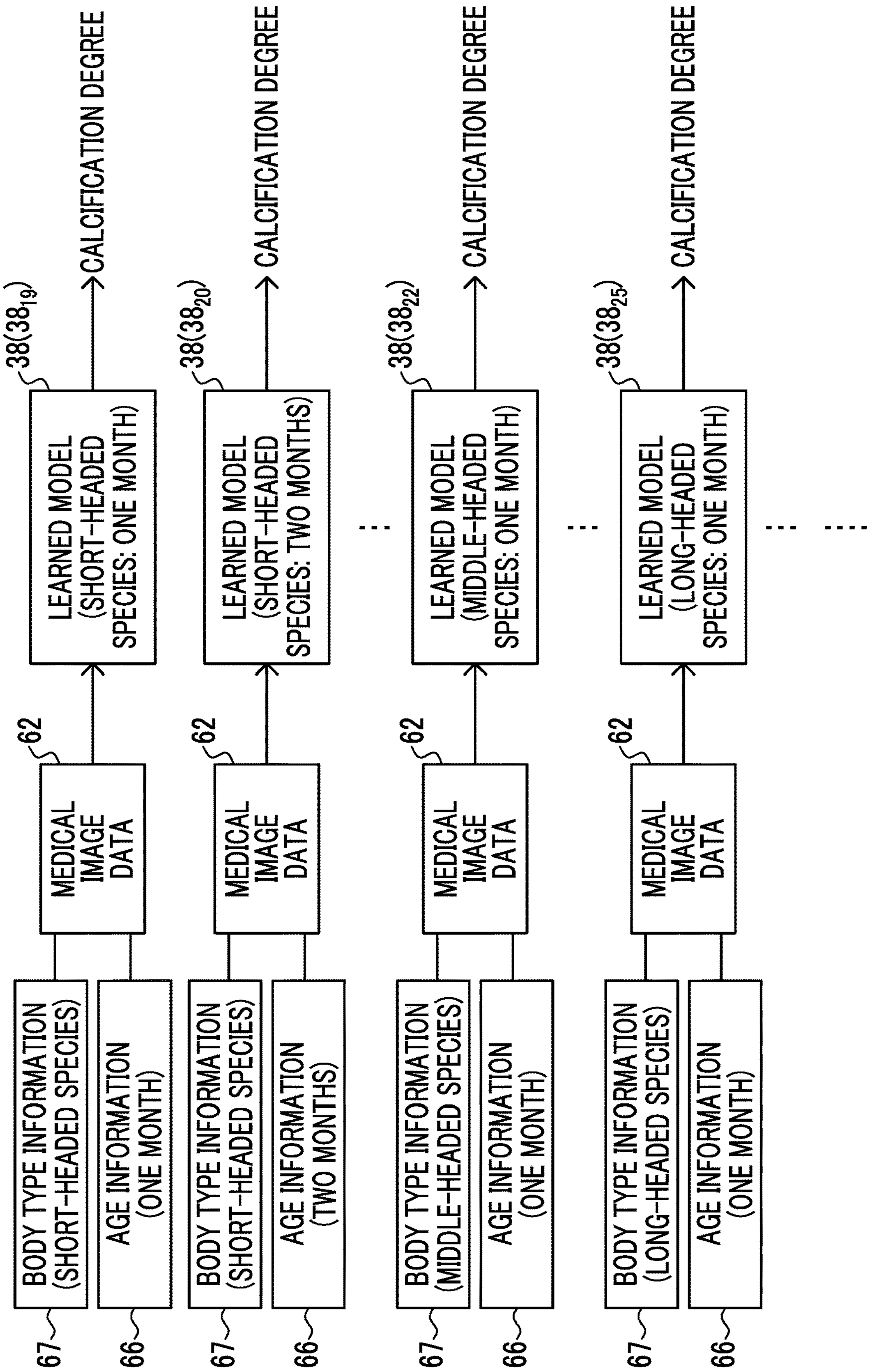
FIG. 30 is a diagram for describing an input and an output of the learned model according to the modification example.

As shown in FIG. 30 as an example, the learned model 38 is generated by the learning by the learning unit 52 described above, which receives the medical image data 62, the body type information 67, and the age information 66 and outputs the information representing the degree of calcification for the calcification of the lung of the subject appearing in the medical image represented by the input medical image data 62, for each combination of the body type and the age. The learning unit 52 stores the generated learned model 38 in the storage unit 22.

Figure 31:
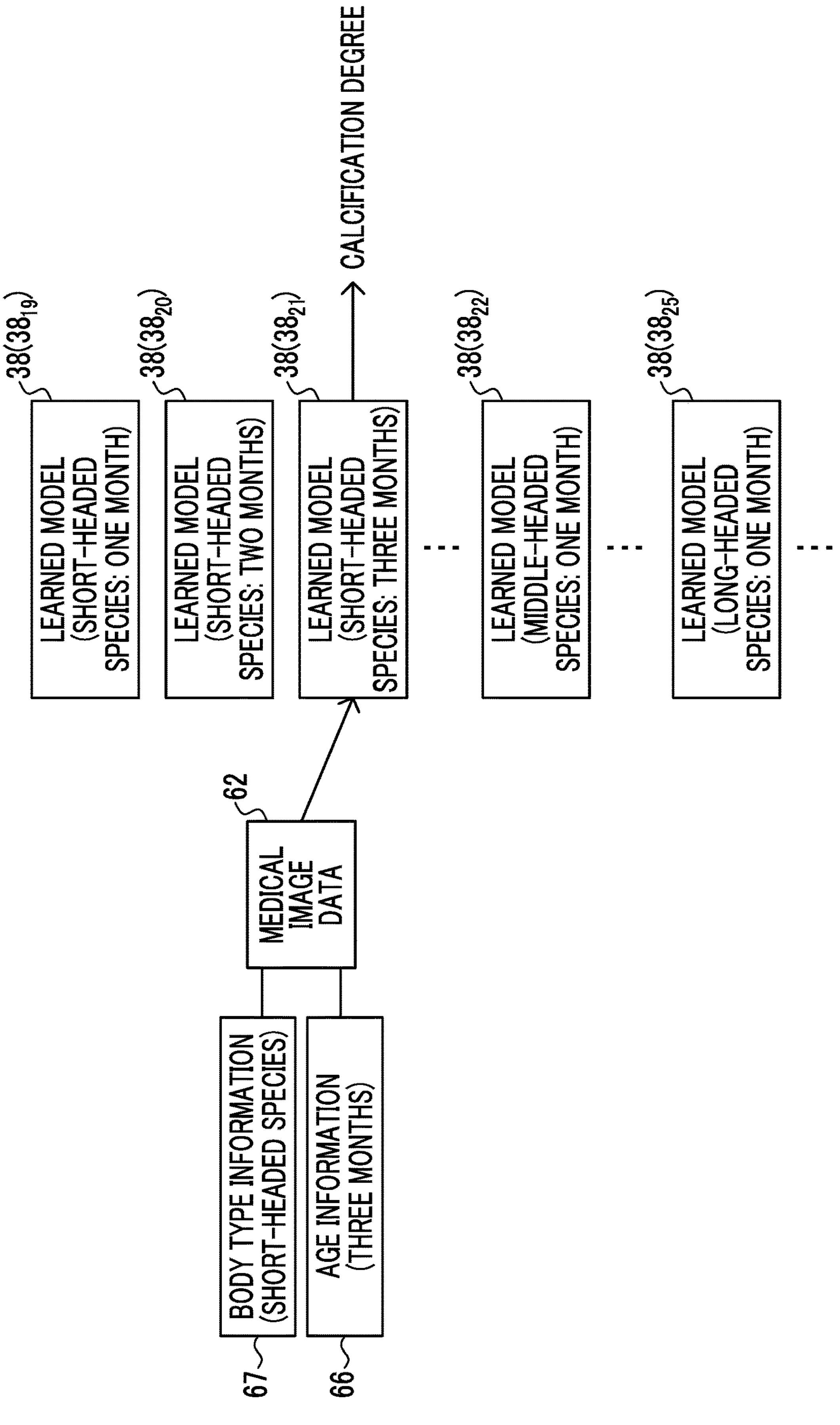
FIG. 31 is a diagram for describing derivation of a degree of calcification using the learned model according to a combination of the body type and the age in a medical care support device according to the modification example.

The functional configuration of the medical care support device 10 according to this modification example in the operation phase is the same as that in the above embodiment. The action of the medical care support device 10 in the operation phase is also the same as the above embodiment except that the learned model 38 to be selected is different according to the combination of the body type information 67 and the age information 66 in the input medical information in a case where the derivation unit 56 derives the degree of calcification of the subject. Specifically, for example, in a case where the body type represented by the body type information 67 in the medical information is the "short-headed species" and the information represented by the age information 66 is "three months", the derivation unit 56 inputs the medical image data 62 to the learned model $38_{21}$ for which the body type is the short-headed species and the age is three months, as shown in FIG. 31. The information representing the degree of calcification of the subject is output from the learned model $38_{21}$.

As described above, with the medical care support device 10 according to the present embodiment, the degree of calcification of the subject is derived based on the medical information including the medical image data 62, the body type information 67, and the age information 66, and the learned model 38. An example of a factor affecting the degree of calcification of the lung of the subject includes the body type of the subject.

With the medical care support device 10 according to the present embodiment, the degree of calcification of a subject is derived using the learned model 38 that is learned in consideration of the body type of the subject, which is the factor affecting the calcification of the lung. Therefore, it is possible to effectively support the medical care based on the calcification of the lung of the subject.

With the medical care support device 10 according to the present embodiment, the degree of calcification of the lung of the subject can be derived in consideration of the body type of the subject even in a case where the subject is a hybrid such as a so-called mixed dog or in a case where the dog breed is unknown. Therefore, it is possible to more effectively support the medical care.

Fourth Embodiment

Hereinafter, a fourth embodiment will be described in detail.

A configuration of the medical care support system 1 according to the present embodiment is the same as the configuration of the medical care support system 1 according to the first embodiment (refer to FIG. 1), and a description thereof will be omitted. A configuration of the medical care support device 10 according to the present embodiment is the same as the configuration of the medical care support device 10 according to the first embodiment (refer to FIG. 2), and thus a description thereof will be omitted. The learned model 38 and the functional configuration and action in the learning phase according to the present embodiment is also the same as the learned model 38 (refer to FIG. 5) and the functional configuration and action in the learning phase (refer to FIGS. 7 to 9) according to the first embodiment, and thus a description thereof will be omitted.

Figure 32:
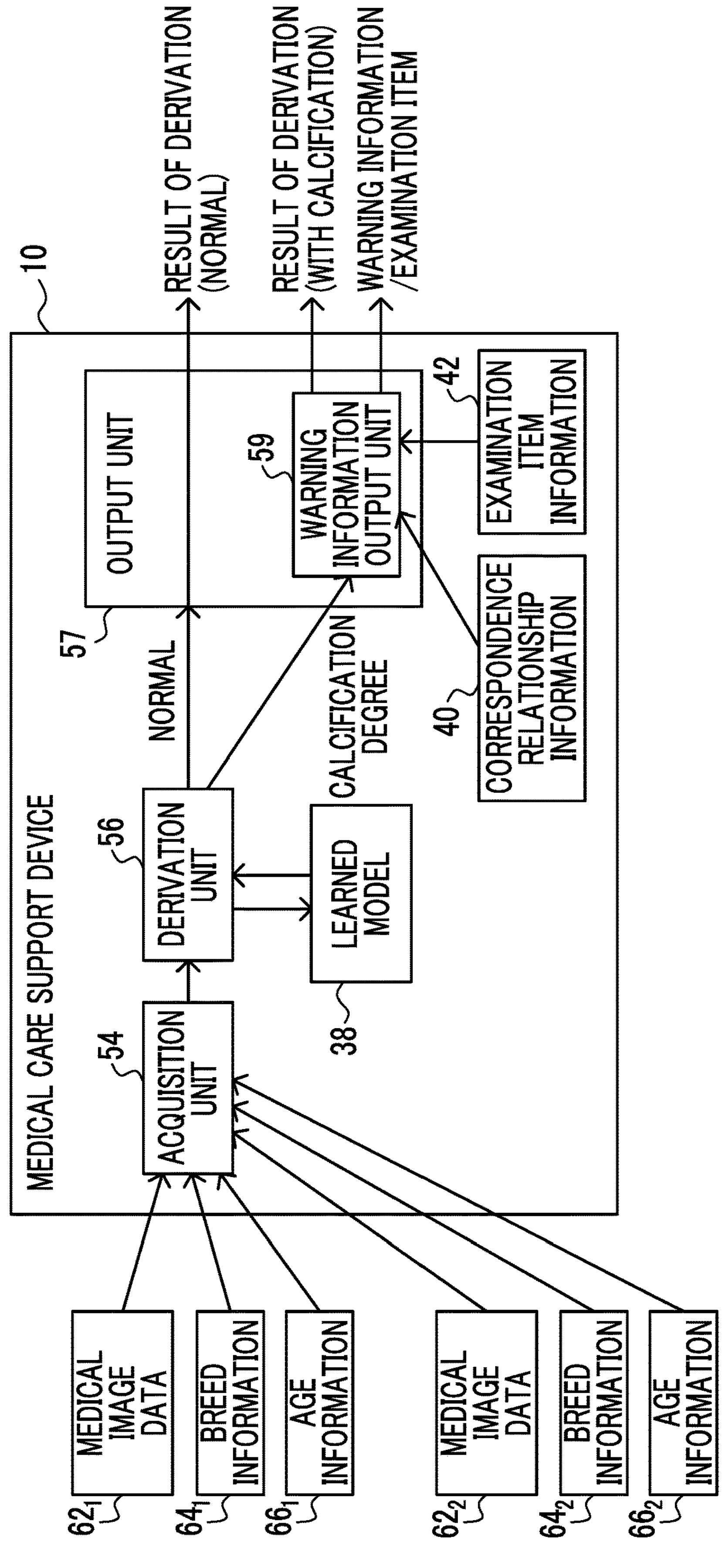
FIG. 32 is a block diagram showing an example of a functional configuration of a medical care support device according to a fourth embodiment in an operation phase.

On the other hand, as shown in FIG. 32, specific operations of the acquisition unit 54, the derivation unit 56, and the warning information output unit 59 in the medical care support device 10 according to the present embodiment, in the functional configuration in the operation phase, are different from the medical care support device 10 (refer to FIG. 10) according to the first embodiment. Therefore, the specific operations of the acquisition unit 54, the derivation unit 56, and the warning information output unit 59 will be described.

The acquisition unit 54 acquires two sets of medical information captured at different ages of the subject. Specifically, the acquisition unit 54 acquires medical image data 62$_1$ representing the medical image obtained by capturing the subject, breed information 64$_1$ representing the dog breed of the subject, and age information 66$_1$ representing the age of the subject when the medical image represented by the medical image data 62$_1$ is captured, as the medical information. The acquisition unit 54 acquires medical image data 62$_2$ representing a medical image in which the subject is captured at a time different from the time of capturing the medical image represented by the medical image data 62$_1$, breed information 64$_2$ representing the dog breed of the subject, and age information 66$_2$ representing the age of the subject when the medical image represented by the medical image data 62$_2$ is captured, as the medical information. The breed information 64$_1$ and the breed information 64$_2$ are the same. Therefore, a form may be employed in which the acquisition unit 54 acquires only one.

The derivation unit 56 derives the degree of calcification of the subject for each of the two sets of medical information acquired by the acquisition unit 54, based on the learned model 38 learned in advance by the learning medical information 30. Specifically, the derivation unit 56 inputs the medical image data 62$_1$ acquired by the acquisition unit 54 to the learned model 38 according to a combination of the dog breed represented by the breed information 64$_1$ and the age represented by the age information 66$_1$ which are acquired by the acquisition unit 54. The derivation unit 56 inputs the medical image data 62$_2$ acquired by the acquisition unit 54 to the learned model 38 according to a combination of the dog breed represented by the breed information 64$_2$ and the age represented by the age information 66$_2$ which are acquired by the acquisition unit 54. The learned model 38 outputs the information representing the degree of calcification of the subject according to the input medical information.

In a case where a rate of change in the degree of calcification of the subject is larger than a reference calcification change rate, the warning information output unit 59 outputs the warning information representing a warning and the information representing the examination item.

Figure 33:
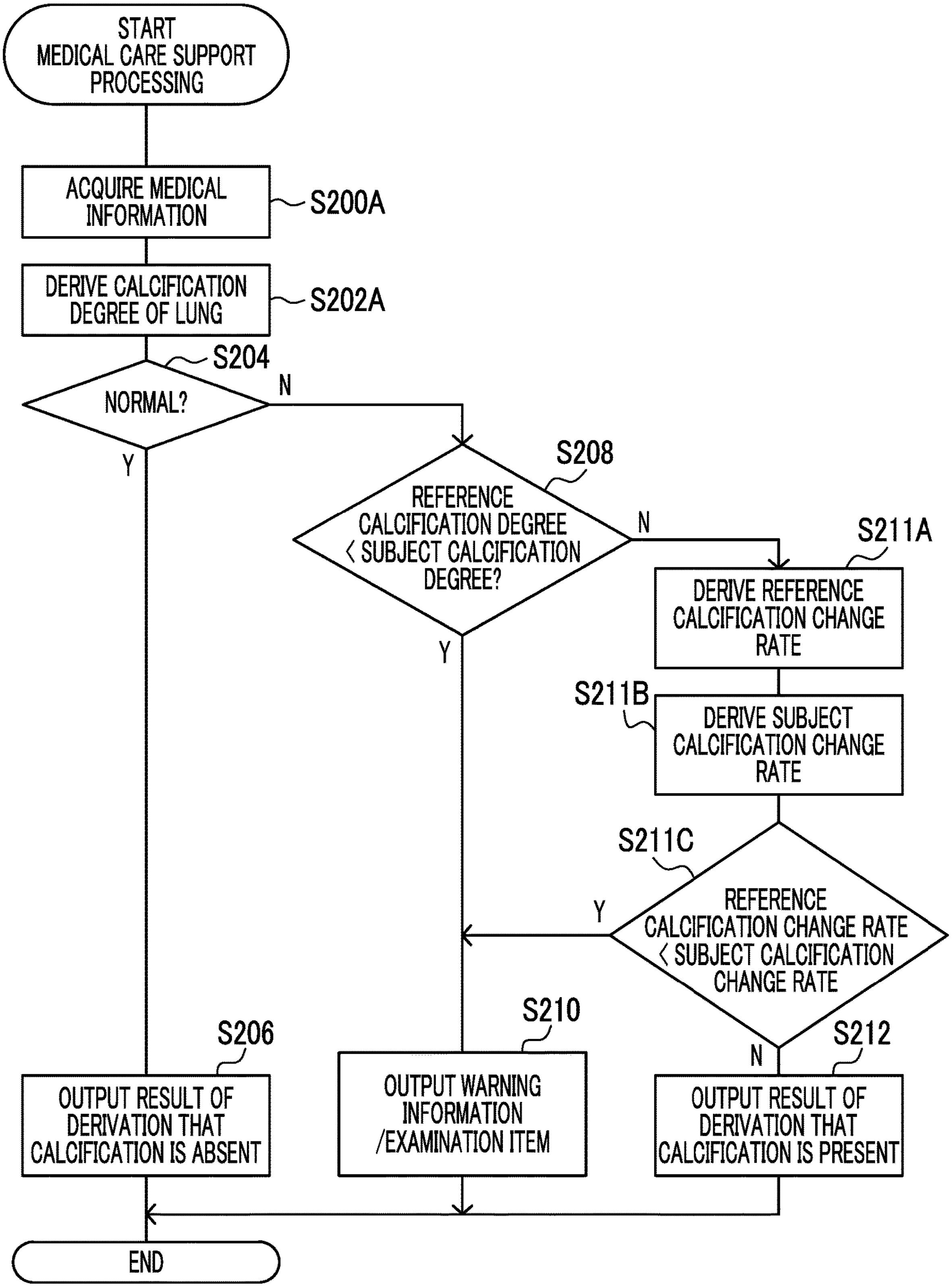
FIG. 33 is a flowchart showing an example of medical care support processing executed by the medical care support device according to the fourth embodiment.

Next, an action of the medical care support device 10 according to the present embodiment in the operation phase will be described. FIG. 33 is a flowchart showing an example of medical care support processing executed by the medical care support device 10 according to the present embodiment. As shown in FIG. 33, the medical care support processing according to the present embodiment is different from the medical care support processing (refer to FIG. 11) according to the first embodiment in that steps S200A and S202A are provided instead of steps S200 and S202, and processing of steps S211A to S211C is included between step S208 and step S212.

In step S200A shown in FIG. 33, the acquisition unit 54 acquires the two sets of medical information of the dog, which is the subject, and outputs the medical information to the derivation unit 56, as described above. Specifically, the acquisition unit 54 acquires the medical image data 62$_1$ representing the medical image of the subject, the breed information 64$_1$ representing the breed of the subject, the age information 66$_1$ representing the age of the subject, the medical image data 62$_2$ representing the medical image of the subject, the breed information 64$_2$ representing the breed of the subject, and the age information 66$_2$ representing the age of the subject, and outputs the medical information to the derivation unit 56.

In next step S202A, the derivation unit 56 derives the degree of calcification of the lung of the subject for each of the two sets of medical information input from the acquisition unit 54 based on the learned model 38, as described above. Specifically, the derivation unit 56 inputs the medical image data 62$_1$ to the learned model 38 selected according to the combination of the breed information 64$_1$ and the age information 66$_1$ in the input medical information to acquire the information representing the degree of calcification of the lung which is output from the learned model 38. The derivation unit 56 inputs the medical image data 62$_2$ to the learned model 38 selected according to the combination of the breed information 64$_2$ and the age information 66$_2$ in the input medical information to acquire the information representing the degree of calcification of the lung which is output from the learned model 38. In this manner, the degree of calcification of the lung of the subject at different ages of the subject is derived by the processing in step S202A.

In a case where the warning information output unit 59 determines in S208 that the degree of calcification of the subject is equal to or less than the reference degree of calcification, the processing proceeds to step S211A. In step S211A, the warning information output unit 59 derives the reference calcification change rate based on the correspondence relationship information 40. Specifically, the reference degree of calcification for each age represented by the age information 36 in each of the two sets of medical information acquired in S200A is acquired from the correspondence relationship information 40. The rate of change in the degree of calcification in the acquired two reference degrees of calcification is derived as the reference calcification change rate. That is, the warning information output unit 59 derives the rate of change in the age-correspondent calcification due to the aging, which is represented by the age information 36$_1$ and 36$_2$ included in each of the two sets of medical information.

In next step S211B, the warning information output unit 59 derives the rate of change in the degree of calcification of the subject as a subject calcification change rate, based on the two degrees of calcification derived in step S202A. That is, the warning information output unit 59 derives the rate of change in an actual degree of calcification between the two ages represented by the age information 36$_1$ and 36$_2$ included in each of the two sets of medical information.

In next step S211C, the warning information output unit 59 determines whether or not the subject calcification change rate is larger than the reference calcification change rate (reference calcification change rate<subject calcification change rate), as described above. In a case where the subject calcification change rate is larger than the reference calcification change rate, the determination in step S211C is affirmative and the processing proceeds to step S210. On the other hand, in a case where the subject calcification change rate is equal to or less than the reference calcification change rate, the determination in step S211C is negative and the processing proceeds to step S212.

As described above, with the medical care support device 10 according to the present embodiment, the warning information and the examination item are output in a case where the subject calcification change rate is derived based on the two sets of medical information and the subject calcification change rate is larger than the reference calcification change rate. In a case where the subject calcification change rate is larger than the reference calcification change rate even though the degree of calcification of the subject is equal to or less than the reference degree of calcification, a change in change abnormality due to the aging occurs and a rate of progress of the calcification is faster than the reference.

With the medical care support device 10 according to the present embodiment, in a case where the rate of progress of the calcification is faster than the reference, the warning information is output. Therefore, it is possible to more effectively support the medical care based on the calcification of the lung of the subject.

As described above, the medical care support device 10 according to the above embodiment comprises the acquisition unit 54 and the derivation unit 56. The acquisition unit 54 acquires the medical information including the medical image data 62 representing the medical image obtained by capturing the lung of the subject, the breed information 64 representing the breed of the subject, and the age information 66 representing the age of the subject when the medical image is captured. The derivation unit 56 derives the degree of calcification of the lung of the subject based on the medical information acquired by the acquisition unit 54 and the learned model 38 learned in advance using the plurality of pieces of learning medical information 30 including the medical image data 32A of the medical image 33A in which the calcification label 72 is assigned to the calcified portion of the lung, the breed information 34, and the age information 36.

As described above, with the medical care support device 10 according to the present embodiment, the degree of calcification of the lung of the subject is derived based on the medical information including the medical image data 62, the breed information 64, and the age information 66, and the learned model 38. Therefore, with the medical care support device 10 according to the present embodiment, it is possible to effectively support the medical care based on the calcification of the lung of the subject.

Various types of information included in the learning medical information 30 used for generating the learned model 38 are not limited to the above embodiments. For example, the learning medical information 30 in the above embodiments may be combined. For example, the learning medical information 30 may include information representing a lung portion such as the right upper lobe, middle lobe, and lower lobe, and the left upper lobe and lower lobe.

A form may be employed in which the warning information output unit 59 derives the degree of change or the rate of change of the calcification for each of the lung portions described above and compare with the reference degree of calcification or the reference calcification change rate. It is preferable to output the comparison result for each lung portion. In this case, a progress state of local calcification of the lung can be presented to the user. Therefore, it is possible to more effectively support the medical care based on the calcification of the lung of the subject.

In the above embodiments, a form in which the dog is employed as the subject is described, but the subject is not limited thereto. For example, a human may be employed as the subject, or an animal other than the dog such as a cat may be employed.

The following various processors may be used as a hardware structure of a processing unit that executes various types of processing such as each functional unit of the medical care support device 10 in the above embodiments. The various processors include a programmable logic device (PLD) which is a processor whose circuit configuration is changeable after manufacturing such as a field-programmable gate array (FPGA), a dedicated electric circuit which is a processor having a circuit configuration exclusively designed to execute specific processing such as an application specific integrated circuit (ASIC), and the like, in addition to the CPU which is a general-purpose processor that executes software (program) to function as various processing units as described above.

One processing unit may be configured by one of the various processors or a combination of two or more processors of the same type or different types (for example, a combination of a plurality of FPGAs or a combination of a CPU and an FPGA). A plurality of processing units may be configured by one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

Further, more specifically, a circuitry combining circuit elements such as semiconductor elements can be used as the hardware structure of the various processors.

Further, in the above embodiment, the learning program 23A and the medical care support program 23B are stored (installed) in the storage unit 22 in advance, but the present disclosure is not limited thereto. Each of the learning program 23A and the medical care support program 23B may be provided in a form of being recorded on a recording medium such as a compact disc read only memory (CD-ROM), a digital versatile disc read only memory (DVD-ROM), and a Universal Serial Bus (USB) memory. Each of the learning program 23A and the medical care support program 23B may be configured to be downloaded from an external device through a network.

The following appendix is disclosed with regard to the above embodiments.

Appendix 1

A medical care support device comprising:

an acquisition unit that captures a lung of a subject and acquires learning medical information including medical image data representing a medical image in which a label is assigned to a calcified portion of the lung, breed information representing a breed of the subject, and age information representing an age of the subject when the medical image is captured; and a learning unit that generates a learned model that outputs information representing a degree of calcification of the lung of the subject, based on the medical image data representing the medical image obtained by capturing the lung of the subject and the age information with learning of the learning medical information as learning data.

What is claimed is:

1. A medical care support device comprising:

an acquisition unit that acquires medical information including medical image data representing a medical image obtained by capturing a lung of a subject, breed information representing a breed of the subject, and age information representing an age of the subject when the medical image is captured; and a derivation unit that derives a degree of calcification of the lung of the subject based on the medical information acquired by the acquisition unit and a learned model learned in advance using a plurality of pieces of learning medical information including medical image data representing a medical image in which a label is assigned to a calcified portion of the lung, the breed information, and the age information.

2. The medical care support device according to claim 1, further comprising:

a warning information output unit that outputs warning information in a case where the degree of calcification of the lung of the subject derived by the derivation unit is larger than a degree of calcification of the lung according to the breed and the age of the subject, based on correspondence relationship information stored in a storage unit that stores the correspondence relationship information representing a correspondence relationship between the breed, the age, and the degree of calcification of the lung.

3. The medical care support device according to claim 2, wherein the warning information output unit further outputs examination item information representing a predetermined examination item for the subject, in a case of outputting the warning information.

4. The medical care support device according to claim 1, wherein the medical information includes a plurality of pieces of the medical image data captured at different ages of the subject, and wherein the derivation unit further derives a degree of change in the calcification from the degree of calcification derived for each age of the subject, the medical care support device further comprising:

a warning information output unit that outputs warning information in a case where the degree of change in the calcification derived by the derivation unit is larger than a degree of change in the calcification of the lung according to the breed and the age of the subject, based on correspondence relationship information stored in a storage unit that stores the correspondence relationship information representing a correspondence relationship between the breed, the age, and the degree of calcification of the lung.

5. The medical care support device according to claim 1, wherein a plurality of pieces of learning medical information including medical image data representing a medical image in which a label is assigned to a tumor portion of the lung, the breed information, and the age information are further used for learning of the learned model, and wherein the derivation unit further derives presence or absence of a tumor in the lung of the subject based on the medical information acquired by the acquisition unit and the learned model.

6. The medical care support device according to claim 5, wherein a plurality of pieces of learning medical information including medical image data representing a medical image in which a label is assigned to an undeterminable portion for the calcification and the tumor of the lung, the breed information, and the age information are further used for the learning of the learned model, and wherein the derivation unit further derives presence or absence of the undeterminable portion in the lung of the subject based on the medical information acquired by the acquisition unit and the learned model.

7. The medical care support device according to claim 6, further comprising:

an instruction output unit that outputs an instruction for follow-up observation in a case where the derivation unit derives that the undeterminable portion is present.

8. The medical care support device according to claim 1, wherein the derivation unit derives the degree of calcification of the lung of the subject based on the medical information acquired by the acquisition unit and a learned model learned in advance using a plurality of pieces of learning medical information including the medical image data to which the label is assigned to the calcified portion of the lung, body type information, and the age information, in a case where the acquisition unit acquires the body type information representing a kind relating to a body type of the subject instead of the breed information of the subject.

9. The medical care support device according to claim 8, wherein the kind relating to the body type is large, medium, or small.

10. The medical care support device according to claim 8, wherein the subject is a dog, and wherein the kind relating to the body type is a short-headed species, a middle-headed species, or a long-headed species.

11. A medical care support method executed by a computer, comprising:

acquiring medical information including medical image data representing a medical image obtained by capturing a lung of a subject, breed information representing a breed of the subject, and age information representing an age of the subject when the medical image is captured; and deriving a degree of calcification of the lung of the subject based on the acquired medical information and a learned model learned in advance using a plurality of pieces of learning medical information including medical image data representing a medical image in which a label is assigned to a calcified portion of the lung, the breed information, and the age information.

12. A non-transitory storage medium storing a program that causes a computer to execute a medical care support processing, the processing comprising:

acquiring medical information including medical image data representing a medical image obtained by capturing a lung of a subject, breed information representing a breed of the subject, and age information representing an age of the subject when the medical image is captured; and deriving a degree of calcification of the lung of the subject based on the acquired medical information and a learned model learned in advance using a plurality of pieces of learning medical information including medical image data representing a medical image in which a label is assigned to a calcified portion of the lung, the breed information, and the age information.

* * * * *